United States Patent
Li et al.

(10) Patent No.: US 12,432,022 B2
(45) Date of Patent: Sep. 30, 2025

(54) ACKNOWLEDGEMENT PACKET PROCESSING METHOD, COMMUNICATIONS APPARATUS, AND STORAGE MEDIUM

(71) Applicant: HUAWEI TECHNOLOGIES CO., LTD., Guangdong (CN)

(72) Inventors: Tong Li, Shenzhen (CN); Kai Zheng, Beijing (CN); Junsen Chen, Shenzhen (CN); Shengjun Chen, Shenzhen (CN); Jiao Kang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 781 days.

(21) Appl. No.: 17/730,272

(22) Filed: Apr. 27, 2022

(65) Prior Publication Data

US 2022/0255692 A1 Aug. 11, 2022

Related U.S. Application Data

(63) Continuation of application No. PCT/CN2020/124291, filed on Oct. 28, 2020.

(30) Foreign Application Priority Data

Oct. 28, 2019 (CN) .......................... 201911033773.9

(51) Int. Cl.
  *H04L 5/00* (2006.01)
  *H04L 1/08* (2006.01)
  *H04L 1/20* (2006.01)

(52) U.S. Cl.
  CPC .............. *H04L 5/0044* (2013.01); *H04L 1/08* (2013.01); *H04L 1/203* (2013.01); *H04L 5/0053* (2013.01)

(58) Field of Classification Search
  CPC ......... H04L 5/0044; H04L 1/08; H04L 1/203; H04L 5/0053; H04L 1/1809; H04L 1/1607; H04L 5/0046; H04L 5/0055
  See application file for complete search history.

(56) References Cited

U.S. PATENT DOCUMENTS 10,154,520 B1 * 12/2018 Hedayat ............ H04W 74/0833
10,298,370 B1 *  5/2019 Chu ..................... H04L 5/0053
(Continued)

FOREIGN PATENT DOCUMENTS

CN           101340268 A          1/2009
CN           104350799 A          2/2015
(Continued)

OTHER PUBLICATIONS

Extended European Search Report for European Application No. 20880862.6 dated Oct. 19, 2022, 11 pages.
(Continued)

*Primary Examiner* — Abdullahi Ahmed

(57) ABSTRACT

The technology of this application relates to an acknowledgement packet processing method, a communications apparatus, and a storage medium, to reduce an ACK sending frequency and improve data transmission efficiency. The acknowledgement packet processing method is applied to a first communications apparatus, and the method includes generating a first ACK packet based on an acknowledgement ACK mechanism supported by the first communications apparatus, where the ACK mechanism is used to indicate N ACK types corresponding to N ACK packets, a trigger condition required for sending each of the N ACK packets, and feedback information carried in each of the N ACK packets, the first ACK packet is one of the N ACK packets, and N is a positive integer greater than or equal to 2. The (Continued)

method further includes sending the first ACK packet to a second communications apparatus.

20 Claims, 13 Drawing Sheets

(56) References Cited

U.S. PATENT DOCUMENTS

| | | | |
|---|---|---|---|
| 2003/0123481 A1* | 7/2003 | Neale | H04L 47/323 |
| | | | 370/466 |
| 2010/0241919 A1 | 9/2010 | Jeon | |
| 2015/0249529 A1 | 9/2015 | Zheng et al. | |
| 2017/0238286 A1 | 8/2017 | Chun et al. | |
| 2018/0069678 A1* | 3/2018 | Kim | H04L 5/0053 |
| 2018/0368021 A1 | 12/2018 | Jung et al. | |
| 2019/0297020 A1* | 9/2019 | Mudireddy | H04L 1/1854 |
| 2021/0235521 A1* | 7/2021 | Sung | H04L 69/163 |
| 2023/0044542 A1* | 2/2023 | Yao | H04W 72/30 |
| 2023/0397192 A1* | 12/2023 | Kanamarlapudi | H04L 5/0053 |

FOREIGN PATENT DOCUMENTS

| | | |
|---|---|---|
| CN | 104704763 A | 6/2015 |
| CN | 104937872 A | 9/2015 |
| CN | 102130756 B | 5/2016 |
| CN | 105897383 A | 8/2016 |
| CN | 106656431 A | 5/2017 |
| CN | 107592185 A | 1/2018 |
| CN | 108683480 A | 10/2018 |
| CN | 109804584 A | 5/2019 |
| WO | 2015154523 A1 | 10/2015 |
| WO | 2017101503 A1 | 6/2017 |
| WO | 2019183519 A1 | 9/2019 |

OTHER PUBLICATIONS

Request for Comments: 1122, R. Braden, Requirements for Internet Hosts—Communication Layers, Network Working Group, Internet Engineering Task Force, Oct. 1989, 116 pages.

Request for Comments: 2018, M. Mathis et al, TCP Selective Acknowledgment Options, Network Working Group, Oct. 1996, 12 pages.

Office Action dated Nov. 24, 2021 for Chinese Application No. 201911033773, 14 pages.

Notice of Allowance dated Jul. 19, 2022 for Chinese Application No. 201911033773, 4 pages.

PCT International Search Report for Application No. PCT/CN2020/124291 dated Oct. 28, 2019, 8 pages.

* cited by examiner

| Type=40 | Length=2 |
|---|---|

FIG. 11a

| Type=41 | Length=3 | Value=0x00–0xff |
|---|---|---|

FIG. 11b

| Type=42 | Length=6 | Value=PKT.SEQ |
|---|---|---|

FIG. 11c

| TCP header (fixed) | |
|---|---|
| TCP header (optional) | Padding |
| TACK delay | |
| Bandwidth information | |
| Window information | |
| Amount of data that is received in a receive buffer and that is not submitted to an upper-layer application | |
| HOL.SEQ | |
| Count of added RBBs | |
| Left endpoint of the added RBB | |
| Right endpoint of the added RBB | |

FIG. 12

ACKNOWLEDGEMENT PACKET PROCESSING METHOD, COMMUNICATIONS APPARATUS, AND STORAGE MEDIUM

CROSS-REFERENCE TO RELATED APPLICATIONS

This application is a continuation of International Application No. PCT/CN2020/124291, filed on Oct. 28, 2020, which claims priority to Chinese Patent Application No. 201911033773.9, filed on Oct. 28, 2019. The disclosures of the aforementioned applications are hereby incorporated by reference in their entireties.

TECHNICAL FIELD

This application relates to the field of computer technologies, and in particular, to an acknowledgement packet processing method, a communications apparatus, and a storage medium.

BACKGROUND

In a data transmission scenario, a sender interacts with a receiver by using a transmission control protocol (TCP) packet. Each time the sender sends a data packet, the receiver returns an acknowledgement (ACK) packet. The TCP packet carries an ACK flag bit, and the ACK flag bit is used to mark whether the TCP packet is an ACK packet or a data packet. When the TCP packet is an ACK packet, an acknowledgement number carried in the TCP packet includes feedback information. The feedback information is used to feed back an ordered maximum sequence number received by the receiver.

In the foregoing ACK mechanism implemented based on the TCP packet, each time a data packet is sent, a peer end needs to return an ACK packet. Therefore, there are problems of a high ACK sending frequency and low data transmission efficiency, and adaptation to diversified data transmission scenarios cannot be implemented. For example, a high ACK sending frequency is inapplicable to data transmission in a wireless local area network. This is because there needs to be a period of idle time and a random back-off time before a spectrum is used, and overheads in wireless transmission are counted not by a packet size but by a quantity of packets. Therefore, there are similar overheads for the ACK packet and the data packet, and a relatively large quantity of transmission resources are consumed.

A typical process of transmitting and acknowledging the TCP packet is described below by using an example. The sender sends five data packets: data-1, data-2, data-3, data-4, and data-5. If data-2 is lost, the receiver returns three ACK packets: ack-data-1, ack-data-1, and ack-data-1. If only data-2 is lost, the receiver receives the other data packets (in other words, the receiver receives data-3, data-4, and data-5.) However, the sender needs to retransmit data-2 and other data packets after data-2, and consequently there is low data transmission efficiency.

It may be learned from the foregoing description that in the current ACK mechanism, there are the problems of a high ACK sending frequency and low data transmission efficiency.

SUMMARY

Embodiments of this application provide an acknowledgement packet processing method, a communications apparatus, and a storage medium, to reduce an ACK sending frequency and improve data transmission efficiency.

To resolve the foregoing technical problem, embodiments of this application provide the following technical solutions.

According to a first aspect, an embodiment of this application provides an acknowledgement packet processing method. The method is applied to a first communications apparatus, and the method includes: generating a first ACK packet based on an acknowledgement ACK mechanism supported by the first communications apparatus, where the ACK mechanism is used to indicate N ACK types corresponding to N ACK packets, a trigger condition required for sending each of the N ACK packets, and feedback information carried in each of the N ACK packets, the first ACK packet is one of the N ACK packets, and N is a positive integer greater than or equal to 2; and sending the first ACK packet to a second communications apparatus. In this embodiment of this application, the first communications apparatus generates the first ACK packet based on the acknowledgement ACK mechanism supported by the first communications apparatus. The ACK mechanism is used to indicate the N ACK types corresponding to the N ACK packets, the trigger condition required for sending each of the N ACK packets, and the feedback information carried in each of the N ACK packets, the first ACK packet is one of the N ACK packets, and N is greater than or equal to 2. The ACK mechanism used by the first communications apparatus includes the ACK type, the trigger condition, and the feedback information. Therefore, during generation of the first ACK packet, the first communications apparatus needs to generate the first ACK packet based on the ACK type and the feedback information included in the ACK mechanism. In addition, whether a trigger condition required for the first ACK packet is met needs to be further determined before it is determined whether the first ACK packet needs to be generated, and then the first communications apparatus sends the first ACK packet to the second communications apparatus. The second communications apparatus first receives, based on an acknowledgement ACK mechanism supported by the second communications apparatus, the first ACK packet sent by the first communications apparatus, the second communications apparatus determines a first ACK type corresponding to the first ACK packet based on the ACK mechanism supported by the second communications apparatus, and finally, the second communications apparatus parses the first ACK packet by using the first ACK type, to generate an ACK parsing result. In this embodiment of this application, the ACK mechanism may be defined based on the ACK type, the trigger condition, and the feedback information. Therefore, a plurality of ACK types of ACK packets are flexibly customized, and the ACK packet is sent based on the trigger condition, to reduce an ACK sending frequency and improve data transmission efficiency. In a possible implementation, the first ACK packet includes the first ACK type and first feedback information, and the first ACK type is one of the N ACK types. In this solution, if the trigger condition of the first ACK packet is met, the first communications apparatus may generate the first ACK packet based on the ACK mechanism supported by the first communications apparatus. The ACK mechanism indicates the ACK type and the feedback information. Therefore, the first ACK packet generated by the first communications apparatus may include the first ACK type and the first feedback information. The first ACK type is an ACK type corresponding to the first ACK packet, and the first ACK type is one of the N ACK types. The first feedback information is feedback information carried in the first ACK packet. Feedback information content that needs to be carried in the first feedback information may be determined based on a specific ACK mechanism. This is not limited herein. The first ACK packet generated by the first communications apparatus carries the first ACK type and the first feedback information. Therefore, the second communications apparatus that receives the first ACK packet may determine the ACK type to which the first ACK packet belongs and specific feedback information content carried in the first ACK packet, and accordingly the second communications apparatus may determine whether the first communications apparatus receives a data packet sent by the second communications apparatus and a feedback status of the first communications apparatus for the received data packet.

In a possible implementation, the first ACK packet includes an ACK type option; a size of the ACK type option is (2+m) bytes, where a value of m is a positive integer, and the value of m is positively correlated with a value of N; one of the (2+m) bytes is used to indicate a kind of the ACK type option; another byte in the (2+m) bytes is used to indicate a length of the ACK type option; and the remaining m bytes in the (2+m) bytes are used to indicate the first ACK type. In this solution, the ACK type option in the first ACK packet may be used to indicate the first ACK type corresponding to the first ACK packet. For example, the ACK type option may include the following three parts: a kind field, a length field, and an ACK type field. Each of the kind field and the length field occupies 1 byte, and the ACK type field occupies m bytes. The ACK type field may be used to indicate that the ACK type corresponding to the first ACK packet is the first ACK type. Therefore, the first communications apparatus may add the first ACK type to the ACK type field, so that the second communications apparatus determines the first ACK type based on a specific value of the ACK type field in the ACK type option.

In a possible implementation, the first ACK packet further includes a data field; and the data field carries at least a part of the first feedback information. In this solution, the first feedback information may include a plurality of pieces of feedback sub-information, and a part or all of the first feedback information may be carried in the data field. Therefore, an amount of information carried in the data field is increased, and transmission efficiency of the feedback information is improved. In addition, the data field may further carry a plurality of types of richer feedback information. Therefore, in this embodiment of this application, an amount of information carried in the ACK packet is increased.

In a possible implementation, before the generating a first ACK packet based on an acknowledgement ACK mechanism supported by the first communications apparatus, the method further includes: sending a first negotiation packet to the second communications apparatus, where the first negotiation packet is used to indicate the ACK mechanism supported by the first communications apparatus; receiving a second negotiation packet sent by the second communications apparatus, where the second negotiation packet is used to indicate the ACK mechanism supported by the second communications apparatus; and when the first communications apparatus and the second communications apparatus use ACK mechanisms that match each other, triggering execution of the following step of generating the first ACK packet based on the acknowledgement ACK mechanism supported by the first communications apparatus. In this solution, before the first communications apparatus starts to transmit data and send the acknowledgement packet to the second communications apparatus, the first communications apparatus and the second communications apparatus may further first perform negotiation of the ACK mechanisms supported by the first communications apparatus and the second communications apparatus. For example, the two communication parties (e.g., the first communications apparatus and the second communications apparatus) perform link establishment and negotiation through handshake. In a process of constructing the negotiation packet, the first communications apparatus indicates, by using the negotiation packet, that the first communications apparatus supports a specified ACK mechanism. In a process of constructing the negotiation packet, the second communications apparatus indicates, by using the negotiation packet, whether the second communications apparatus supports the specified ACK mechanism. If both the first communications apparatus and the second communications apparatus support the same ACK mechanism, negotiation between the first communications apparatus and the second communications apparatus succeeds, and in a subsequent data packet transmission process, the ACK mechanism is used to send and receive an ACK packet. If negotiation between the first communications apparatus and the second communications apparatus fails, the solution provided in this embodiment of this application is not used to send and receive an ACK packet. Both of the two communication parties send the negotiation packets to perform negotiation of the ACK mechanism, and therefore the two communication parties can correctly send and receive the ACK packet.

In a possible implementation, the first negotiation packet includes a first permitted option, and the second negotiation packet includes a second permitted option; a size of the first permitted option is 2 bytes, one byte in the first permitted option is used to indicate a kind of the first permitted option, and the other byte in the first permitted option is used to indicate a length of the first permitted option; and a size of the second permitted option is 2 bytes, one byte in the second permitted option is used to indicate a kind of the second permitted option, and the other byte in the second permitted option is used to indicate a length of the second permitted option. In this solution, the first negotiation packet may be indicated by using the first permitted option. Therefore, the first communications apparatus may add an ACK mechanism supported by the first communications apparatus to the first permitted option in the first negotiation packet, so that after receiving the first negotiation packet, the second communications apparatus may determine, by parsing the first permitted option, the ACK mechanism supported by the first communications apparatus. Similarly, after receiving the second negotiation packet, the first communications apparatus may determine, by parsing the second permitted option, an ACK mechanism supported by the second communications apparatus. Both of the two communication parties send the negotiation packets, so that negotiation of the ACK mechanism may be completed, to ensure that the two communication parties send and receive the ACK packet by using the same ACK mechanism.

In a possible implementation, a trigger condition for generating the first ACK packet includes at least one of the following: sending the first ACK packet based on a preset ACK sending frequency, and sending the first ACK packet when a preset instant event occurs. In this solution, trigger conditions respectively corresponding to the N ACK packets may be indicated in the ACK mechanism. Description is provided by using the trigger condition for generating the first ACK packet as an example. There may be two types of trigger conditions: an ACK sending frequency and an instant event. The ACK sending frequency is a sending frequency for sending an ACK, and the ACK packet can be generated and sent only when the ACK sending frequency is met. For example, the ACK sending frequency may be that the ACK packet is sent each time there is an interval of a specific time period. Alternatively, the ACK sending frequency may be that the ACK packet is sent each time a specific quantity of data packets are received. The instant event is event information that can trigger sending of the ACK packet. The ACK packet can be generated and sent only when the instant event indicated in the ACK mechanism occurs. The instant event may alternatively be configured based on a specific application scenario. For example, the instant event may be a packet loss event or an event that a receive buffer is full. Based on the trigger condition, in this embodiment of this application, the ACK packet may be generated based on a requirement, and therefore the ACK packet may be dynamically adjusted.

In a possible implementation, the method further includes: receiving an ACK frequency frame from the second communications apparatus, where the ACK frequency frame is used to indicate an ACK sending frequency to the first communications apparatus; and determining the ACK sending frequency based on the ACK frequency frame, where the trigger condition of the first ACK packet includes: sending the first ACK packet based on the ACK sending frequency. The ACK sending frequency is a sending frequency for sending an ACK, and the ACK packet can be generated and sent only when the ACK sending frequency is met. In this embodiment of this application, the second communications apparatus may generate the ACK frequency frame, where the ACK frequency frame carries the ACK sending frequency, so that the first communications apparatus may obtain the ACK sending frequency from the second communications apparatus. For example, the ACK frequency frame may be a frame generated by using a quick UDP internet connection (QUIC) protocol.

In a possible implementation, the ACK frequency frame includes a frame type indicator, a frame sequence number, and an ACK frequency field, the frame type indicator is used to indicate a type of the ACK frequency frame, the frame sequence number is a sequence number of the ACK frequency frame, and the ACK frequency field is used to indicate the ACK sending frequency. The frame type indicator may indicate the type of the ACK frequency frame. For example, a value of the frame type indicator is 0xXX, and a value of XX may include a value from 00 to FF. For example, the value of the frame type indicator may be a frame type value that is not used in the QUIC protocol. The frame sequence number is the sequence number of the ACK frequency frame, and is configured by the second communications apparatus based on a specific application scenario. The first communications apparatus may obtain the sequence number of the ACK frequency frame based on the frame sequence number. The ACK frequency field is used to indicate the ACK sending frequency determined by the second communications apparatus. For example, the ACK frequency field is specifically an ACK intensity field in the QUIC protocol, and the field carries the ACK sending frequency. A manner in which the second communications apparatus determines the ACK sending frequency is not limited in this embodiment of this application.

In a possible implementation, the sending the first ACK packet based on a preset ACK sending frequency includes at least one of the following: sending the first ACK packet each time a preset quantity of data packets are received, and sending the first ACK packet each time a preset time period passes. In this solution, the ACK sending frequency may be used as the trigger condition for sending the first ACK packet, and the sending the first ACK packet based on a preset ACK sending frequency may include: sending the first ACK packet each time the preset quantity of data packets are received. In addition, the sending the first ACK packet based on a preset ACK sending frequency may further include: sending the first ACK packet each time the preset time period passes. The first communications apparatus needs to send the first ACK packet based on the preset time period regardless of whether there is a data packet that arrives at the first communications apparatus. Based on the trigger condition, in this embodiment of this application, the ACK packet may be generated based on a requirement, and therefore the ACK packet may be dynamically adjusted.

In a possible implementation, the first communications apparatus performs communication through a connection between the first communications apparatus and the second communications apparatus, and the sending the first ACK packet each time a preset quantity of data packets are received includes: obtaining a bandwidth and delay product of the connection; and when the bandwidth and delay product is less than a preset threshold, sending the first ACK packet each time the preset quantity of data packets are received; or when the bandwidth and delay product is less than or equal to a preset threshold, sending the first ACK packet each time the preset quantity of data packets are received. In this solution, in this embodiment of this application, the first communications apparatus may determine an ACK sending frequency based on whether the bandwidth and delay product is less than the threshold. In this way, the ACK packet is generated based on a requirement, and therefore the ACK packet may be dynamically adjusted.

In a possible implementation, the threshold is $\beta \times L \times MSS$, and the preset quantity is $L \times MSS$, where $\beta$ represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus. In this solution, the first communications apparatus may accurately obtain the bandwidth and delay product in the foregoing calculation manner of using the threshold and the preset quantity, and may further dynamically adjust the ACK packet based on the preset quantity.

In a possible implementation, the first communications apparatus performs communication through a connection between the first communications apparatus and the second communications apparatus, and the sending the first ACK packet each time a preset time period passes includes: obtaining a bandwidth and delay product of the connection; and when the bandwidth and delay product is greater than or equal to a preset threshold, sending the first ACK packet each time the preset time period passes; or when the bandwidth and delay product is greater than a preset threshold, sending the first ACK packet each time the preset time period passes. In this solution, in this embodiment of this application, the first communications apparatus may determine an ACK sending frequency based on whether the bandwidth and delay product is less than the threshold. In this way, the ACK packet is generated based on a requirement, and therefore the ACK packet may be dynamically adjusted.

In a possible implementation, the threshold is β×L×MSS, and the preset time period is $$\frac{RTT\min}{\beta},$$

where β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus. In this solution, the first communications apparatus may accurately obtain the bandwidth and delay product in the foregoing calculation manner of using the threshold and the preset time period, and may further dynamically adjust the ACK packet based on the preset time period.

In a possible implementation, the obtaining a bandwidth and delay product of the connection includes: obtaining maximum bandwidth of the connection between the first communications apparatus and the second communications apparatus and the minimum round-trip time between the first communications apparatus and the second communications apparatus, and determining that the bandwidth and delay product is equal to a result obtained by multiplying the maximum bandwidth and the minimum round-trip time; or obtaining average bandwidth of the connection between the first communications apparatus and the second communications apparatus and an average round-trip time between the first communications apparatus and the second communications apparatus, and determining that the bandwidth and delay product is equal to a result obtained by multiplying the average bandwidth and the average round-trip time. In this solution, there are a plurality of methods for calculating the bandwidth and delay product. For example, the first communications apparatus may use the result obtained by multiplying the maximum bandwidth and the minimum round-trip time as the bandwidth and delay product. For another example, the first communications apparatus may use the result obtained by multiplying the average bandwidth and the average round-trip time as the bandwidth and delay product. The first communications apparatus may calculate the bandwidth and delay product in each of the plurality of calculation manners. Therefore, the first communications apparatus may determine the ACK sending frequency based on whether the bandwidth and delay product is less than the threshold. In this way, the ACK packet is generated based on a requirement, and therefore the ACK packet may be dynamically adjusted.

In a possible implementation, the instant event includes at least one of the following: a packet loss event and an event that a receive buffer of the first communications apparatus has no remaining capacity. In this solution, the first communications apparatus may customize a plurality of instant events in the ACK mechanism, for example, the packet loss event (loss event) and the event that the receive buffer of the first communications apparatus has no remaining capacity. That a receive buffer has no remaining capacity means that the receive buffer of the first communications apparatus is full. For example, the first communications apparatus that serves as a receiver may generate the ACK packet based on a requirement and based on a network status change, for example, information indicating that a delay or bandwidth change reaches a threshold, a packet loss rate, a quantity of lost packets, or a disorder degree reaches a threshold, or a remaining capacity of the receive buffer reaches a threshold. In this embodiment of this application, the first communications apparatus may send the ACK packet based on the customized instant event. In this way, the ACK packet is generated based on a requirement, and therefore the ACK packet may be dynamically adjusted.

In a possible implementation, the feedback information carried in each of the N ACK packets includes at least one of the following: delay information of the connection between the first communications apparatus and the second communications apparatus, bandwidth information of the connection between the first communications apparatus and the second communications apparatus, jitter information of the connection between the first communications apparatus and the second communications apparatus, packet loss information of the connection between the first communications apparatus and the second communications apparatus information, and status flag information of the connection between the first communications apparatus and the second communications apparatus. In this solution, specifically, in this embodiment of this application, the first communications apparatus may flexibly customize a plurality of types of feedback information in the ACK mechanism. Therefore, the first ACK packet generated by the first communications apparatus may carry various types of feedback information, so that the second communications apparatus may receive a plurality of types of feedback information sent by the first communications apparatus, to implement more comprehensive information feedback.

In a possible implementation, before the generating a first ACK packet based on an acknowledgement ACK mechanism supported by the first communications apparatus, the method includes: receiving a first data packet sent by the second communications apparatus, where the first data packet carries data content and a first packet sequence number, and when the first communications apparatus determines that the first data packet is lost, the first ACK packet is used to indicate that the first data packet is lost; and receiving a second data packet sent by the second communications apparatus, where the second data packet carries the data content and a second packet sequence number, and the second packet sequence number and the first packet sequence number are different packet sequence numbers. In this solution, the first communications apparatus receives the first data packet and the second data packet sent by the second communications apparatus, and the first communications apparatus may determine, based on a difference between the packet sequence numbers carried in the two data packets, a data packet that is lost and retransmitted, to improve packet loss recovery efficiency.

According to a second aspect, an embodiment of this application further provides an acknowledgement packet processing method. The method is applied to a second communications apparatus, and the method includes: receiving, based on an acknowledgement ACK mechanism supported by the second communications apparatus, a first ACK packet sent by a first communications apparatus, where the ACK mechanism is used to indicate N ACK types corresponding to N ACK packets and feedback information carried in each of the N ACK packets, the first ACK packet is one of the N ACK packets, and N is a positive integer greater than or equal to 2; determining a first ACK type corresponding to the first ACK packet based on the ACK mechanism supported by the second communications apparatus, where the first ACK type is one of the N ACK types;

and parsing the first ACK packet by using the first ACK type, to generate an ACK parsing result. In this embodiment of this application, the second communications apparatus first receives, based on the acknowledgement ACK mechanism supported by the second communications apparatus, the first ACK packet sent by the first communications apparatus, the second communications apparatus determines the first ACK type corresponding to the first ACK packet based on the ACK mechanism supported by the second communications apparatus, and finally, the second communications apparatus parses the first ACK packet by using the first ACK type, to generate the ACK parsing result. In this embodiment of this application, the ACK mechanism may be defined based on the ACK type, a trigger condition, and the feedback information. Therefore, a plurality of ACK types of ACK packets are flexibly customized, and the ACK packet is sent based on the trigger condition, to reduce an ACK sending frequency and improve data transmission efficiency.

In a possible implementation, the first ACK packet includes the first ACK type and first feedback information. In this solution, if a trigger condition of the first ACK packet is met, the first communications apparatus may generate the first ACK packet based on an ACK mechanism supported by the first communications apparatus. The ACK mechanism indicates an ACK type and feedback information. Therefore, the first ACK packet generated by the first communications apparatus may include the first ACK type and the first feedback information. The first ACK type is an ACK type corresponding to the first ACK packet, and the first ACK type is one of the N ACK types. The first feedback information is feedback information carried in the first ACK packet. Feedback information content that needs to be carried in the first feedback information may be determined based on a specific ACK mechanism. This is not limited herein. The first ACK packet generated by the first communications apparatus carries the first ACK type and the first feedback information. Therefore, the second communications apparatus that receives the first ACK packet may determine the ACK type to which the first ACK packet belongs and specific feedback information content carried in the first ACK packet, and accordingly the second communications apparatus may determine whether the first communications apparatus receives a data packet sent by the second communications apparatus and a feedback status of the first communications apparatus for the received data packet.

In a possible implementation, the first ACK packet includes an ACK type option; a size of the ACK type option is (2+m) bytes, where a value of m is a positive integer, and the value of m is positively correlated with a value of N; one of the (2+m) bytes is used to indicate a kind of the ACK type option; another byte in the (2+m) bytes is used to indicate a length of the ACK type option; and the remaining m bytes in the (2+m) bytes are used to indicate the first ACK type. In this solution, the ACK type option in the first ACK packet may be used to indicate the first ACK type corresponding to the first ACK packet. For example, the ACK type option may include the following three parts: a kind field, a length field, and an ACK type field. Each of the kind field and the length field occupies 1 byte, and the ACK type field occupies m bytes. The ACK type field may be used to indicate that the ACK type corresponding to the first ACK packet is the first ACK type. Therefore, the first communications apparatus may add the first ACK type to the ACK type field, so that the second communications apparatus determines the first ACK type based on a specific value of the ACK type field in the ACK type option.

In a possible implementation, the first ACK packet further includes a data field; and the data field carries at least a part of the first feedback information.

In a possible implementation, before the receiving, based on an acknowledgement ACK mechanism supported by the second communications apparatus, a first ACK packet sent by a first communications apparatus, the method further includes: receiving a first negotiation packet sent by the first communications apparatus, where the first negotiation packet is used to indicate the ACK mechanism supported by the first communications apparatus; sending a second negotiation packet to the first communications apparatus, where the second negotiation packet is used to indicate the ACK mechanism supported by the second communications apparatus; and when the first communications apparatus and the second communications apparatus use ACK mechanisms that match each other, triggering execution of the following step of receiving, based on an acknowledgement ACK mechanism supported by the second communications apparatus, a first ACK packet sent by a first communications apparatus. In this solution, both of the two communication parties send the negotiation packets to perform negotiation of the ACK mechanism, and therefore the two communication parties can correctly send and receive the ACK packet.

In a possible implementation, the first negotiation packet includes a first permitted option, and the second negotiation packet includes a second permitted option; a size of the first permitted option is 2 bytes, one byte in the first permitted option is used to indicate a kind of the first permitted option, and the other byte in the first permitted option is used to indicate a length of the first permitted option; and a size of the second permitted option is 2 bytes, one byte in the second permitted option is used to indicate a kind of the second permitted option, and the other byte in the second permitted option is used to indicate a length of the second permitted option.

In a possible implementation, before the receiving, based on an acknowledgement ACK mechanism supported by the second communications apparatus, a first ACK packet sent by a first communications apparatus, the method further includes: sending a first data packet to the first communications apparatus, where the first data packet carries data content and a first packet sequence number; and when determining, based on the first ACK packet, that the first data packet is lost, sending a second data packet to the first communications apparatus, where the second data packet carries the data content and a second packet sequence number, and the second packet sequence number and the first packet sequence number are different packet sequence numbers. In this solution, the second communications apparatus separately sends the first data packet and the second data packet to the first communications apparatus, so that the first communications apparatus may determine, based on a difference between the packet sequence numbers carried in the two data packets, a data packet that is lost and retransmitted, to improve packet loss recovery efficiency.

In a possible implementation, the method further includes: sending an ACK frequency frame to the first communications apparatus. The ACK frequency frame is used to indicate an ACK sending frequency to the first communications apparatus.

In a possible implementation, the ACK frequency frame includes a frame type indicator, a frame sequence number, and an ACK frequency field, the frame type indicator is used to indicate a type of the ACK frequency frame, the frame sequence number is a sequence number of the ACK frequency frame, and the ACK frequency field is used to indicate the ACK sending frequency.

According to a third aspect, an embodiment of this application further provides a communications apparatus, including: a processing module, configured to generate a first ACK packet based on an acknowledgement ACK mechanism supported by the first communications apparatus, where the ACK mechanism is used to indicate N ACK types corresponding to N ACK packets, a trigger condition required for sending each of the N ACK packets, and feedback information carried in each of the N ACK packets, the first ACK packet is one of the N ACK packets, and N is a positive integer greater than or equal to 2; and a transceiver module, configured to send the first ACK packet to a second communications apparatus.

In some embodiments of this application, the first ACK packet includes a first ACK type and first feedback information, and the first ACK type is one of the N ACK types.

In some embodiments of this application, the first ACK packet includes an ACK type option; a size of the ACK type option is (2+m) bytes, where a value of m is a positive integer, and the value of m is positively correlated with a value of N; one of the (2+m) bytes is used to indicate a kind of the ACK type option; another byte in the (2+m) bytes is used to indicate a length of the ACK type option; and the remaining m bytes in the (2+m) bytes are used to indicate the first ACK type.

In some embodiments of this application, the first ACK packet further includes a data field; and the data field carries at least a part of the first feedback information.

In some embodiments of this application, the transceiver module is further configured to send a first negotiation packet to the second communications apparatus before the processing module generates the first ACK packet based on the acknowledgement ACK mechanism supported by the first communications apparatus, where the first negotiation packet is used to indicate the ACK mechanism supported by the first communications apparatus; and the transceiver module is further configured to: receive a second negotiation packet sent by the second communications apparatus, where the second negotiation packet is used to indicate an ACK mechanism supported by the second communications apparatus; and when the first communications apparatus and the second communications apparatus use ACK mechanisms that match each other, trigger the processing module to generate the first ACK packet based on the acknowledgement ACK mechanism supported by the first communications apparatus.

In some embodiments of this application, the first negotiation packet includes a first permitted option, and the second negotiation packet includes a second permitted option; a size of the first permitted option is 2 bytes, one byte in the first permitted option is used to indicate a kind of the first permitted option, and the other byte in the first permitted option is used to indicate a length of the first permitted option; and a size of the second permitted option is 2 bytes, one byte in the second permitted option is used to indicate a kind of the second permitted option, and the other byte in the second permitted option is used to indicate a length of the second permitted option.

In some embodiments of this application, a trigger condition for generating the first ACK packet includes at least one of the following: sending the first ACK packet based on a preset ACK sending frequency, and sending the first ACK packet when a preset instant event occurs.

In some embodiments of this application, the sending the first ACK packet based on a preset ACK sending frequency includes at least one of the following: sending the first ACK packet each time a preset quantity of data packets are received, and sending the first ACK packet each time a preset time period passes.

In some embodiments of this application, the first communications apparatus performs communication through a connection between the first communications apparatus and the second communications apparatus, and the sending the first ACK packet each time a preset quantity of data packets are received includes: obtaining a bandwidth and delay product of the connection; and when the bandwidth and delay product is less than a preset threshold, sending the first ACK packet each time the preset quantity of data packets are received; or when the bandwidth and delay product is less than or equal to a preset threshold, sending the first ACK packet each time the preset quantity of data packets are received.

In some embodiments of this application, the threshold is β×L×MSS, and the preset quantity is L×MSS, where β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus.

In some embodiments of this application, the first communications apparatus performs communication through a connection between the first communications apparatus and the second communications apparatus, and the sending the first ACK packet each time a preset time period passes includes: obtaining a bandwidth and delay product of the connection; and when the bandwidth and delay product is greater than or equal to a preset threshold, sending the first ACK packet each time the preset time period passes; or when the bandwidth and delay product is greater than a preset threshold, sending the first ACK packet each time the preset time period passes.

In some embodiments of this application, the threshold is β×L×MSS, and the preset time period is $$\frac{RTT \min}{\beta},$$

where β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus.

In some embodiments of this application, the obtaining a bandwidth and delay product of the connection includes: obtaining maximum bandwidth of the connection between the first communications apparatus and the second communications apparatus and the minimum round-trip time between the first communications apparatus and the second communications apparatus, and determining that the bandwidth and delay product is equal to a result obtained by multiplying the maximum bandwidth and the minimum round-trip time; or obtaining average bandwidth of the connection between the first communications apparatus and the second communications apparatus and an average round-trip time between the first communications apparatus and the second communications apparatus, and determining that the bandwidth and delay product is equal to a result obtained by multiplying the average bandwidth and the average round-trip time.

In some embodiments of this application, the transceiver module is configured to receive an ACK frequency frame from the second communications apparatus, where the ACK frequency frame is used to indicate an ACK sending frequency to the first communications apparatus; and the processing module is configured to determine the ACK sending frequency based on the ACK frequency frame, where the trigger condition of the first ACK packet includes: sending the first ACK packet based on the ACK sending frequency.

In some embodiments of this application, the ACK frequency frame includes a frame type indicator, a frame sequence number, and an ACK frequency field, the frame type indicator is used to indicate a type of the ACK frequency frame, the frame sequence number is a sequence number of the ACK frequency frame, and the ACK frequency field is used to indicate the ACK sending frequency.

In some embodiments of this application, the instant event includes at least one of the following: a packet loss event and an event that a receive buffer of the first communications apparatus has no remaining capacity.

In some embodiments of this application, the feedback information carried in each of the N ACK packets includes at least one of the following: delay information of the connection between the first communications apparatus and the second communications apparatus, bandwidth information of the connection between the first communications apparatus and the second communications apparatus, jitter information of the connection between the first communications apparatus and the second communications apparatus, packet loss information of the connection between the first communications apparatus and the second communications apparatus information, and status flag information of the connection between the first communications apparatus and the second communications apparatus.

In some embodiments of this application, the transceiver module is further configured to: before the processing module generates the first ACK packet based on the acknowledgement ACK mechanism supported by the first communications apparatus, receive a first data packet sent by the second communications apparatus, where the first data packet carries data content and a first packet sequence number, and when the first communications apparatus determines that the first data packet is lost, the first ACK packet is used to indicate that the first data packet is lost; and the transceiver module is further configured to receive a second data packet sent by the second communications apparatus, where the second data packet carries the data content and a second packet sequence number, and the second packet sequence number and the first packet sequence number are different packet sequence numbers.

In the third aspect of this application, the composition modules of the first communications apparatus may further perform the steps described in the foregoing first aspect and various possible implementations. For details, refer to the descriptions in the foregoing first aspect and various possible implementations.

According to a fourth aspect, an embodiment of this application further provides a communications apparatus, including a processing module and a transceiver module. The transceiver module is configured to receive, based on an acknowledgement ACK mechanism supported by the second communications apparatus, a first ACK packet sent by a first communications apparatus. The ACK mechanism is used to indicate N ACK types corresponding to N ACK packets and feedback information carried in each of the N ACK packets, the first ACK packet is one of the N ACK packets, and N is a positive integer greater than or equal to 2. The processing module is configured to determine a first ACK type corresponding to the first ACK packet based on the ACK mechanism supported by the second communications apparatus. The first ACK type is one of the N ACK types. The processing module is further configured to parse the first ACK packet by using the first ACK type, to generate an ACK parsing result.

In some embodiments of this application, the first ACK packet includes the first ACK type and first feedback information.

In some embodiments of this application, the first ACK packet includes an ACK type option; a size of the ACK type option is (2+m) bytes, where a value of m is a positive integer, and the value of m is positively correlated with a value of N; one of the (2+m) bytes is used to indicate a kind of the ACK type option; another byte in the (2+m) bytes is used to indicate a length of the ACK type option; and the remaining m bytes in the (2+m) bytes are used to indicate the first ACK type.

In some embodiments of this application, the first ACK packet further includes a data field; and the data field carries at least a part of the first feedback information.

In some embodiments of this application, the transceiver module is further configured to: before receiving, based on the acknowledgement ACK mechanism supported by the second communications apparatus, the first ACK packet sent by the first communications apparatus, receive a first negotiation packet sent by the first communications apparatus, where the first negotiation packet is used to indicate an ACK mechanism supported by the first communications apparatus; the transceiver module is further configured to send a second negotiation packet to the first communications apparatus, where the second negotiation packet is used to indicate the ACK mechanism supported by the second communications apparatus; and the transceiver module is further configured to: when the first communications apparatus and the second communications apparatus use ACK mechanisms that match each other, trigger execution of the following step of receiving, based on an acknowledgement ACK mechanism supported by the second communications apparatus, a first ACK packet sent by a first communications apparatus.

In some embodiments of this application, the first negotiation packet includes a first permitted option, and the second negotiation packet includes a second permitted option; a size of the first permitted option is 2 bytes, one byte in the first permitted option is used to indicate a kind of the first permitted option, and the other byte in the first permitted option is used to indicate a length of the first permitted option; and a size of the second permitted option is 2 bytes, one byte in the second permitted option is used to indicate a kind of the second permitted option, and the other byte in the second permitted option is used to indicate a length of the second permitted option.

In some embodiments of this application, the transceiver module is further configured to send a first data packet to the first communications apparatus before receiving, based on the acknowledgement ACK mechanism supported by the second communications apparatus, the first ACK packet sent by the first communications apparatus, where the first data packet carries data content and a first packet sequence number; and the transceiver module is further configured to send a second data packet to the first communications apparatus when determining, based on the first ACK packet, that the first data packet is lost, where the second data packet carries the data content and a second packet sequence number, and the second packet sequence number and the first packet sequence number are different packet sequence numbers.

In some embodiments of this application, the transceiver module is configured to send an ACK frequency frame to the first communications apparatus, where the ACK frequency frame is used to indicate an ACK sending frequency to the first communications apparatus.

In some embodiments of this application, the ACK frequency frame includes a frame type indicator, a frame sequence number, and an ACK frequency field, the frame type indicator is used to indicate a type of the ACK frequency frame, the frame sequence number is a sequence number of the ACK frequency frame, and the ACK frequency field is used to indicate the ACK sending frequency.

In the fourth aspect of this application, the composition modules of the second communications apparatus may further perform the steps described in the foregoing second aspect and various possible implementations. For details, refer to the descriptions in the foregoing second aspect and various possible implementations.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communications apparatus. The communications apparatus may include an entity such as a terminal device or a chip. The communications apparatus includes a processor and a communications interface. The communications interface is configured to communicate with another communications apparatus. The processor is configured to execute instructions in a memory, to enable the communications apparatus to perform the method according to any one of the first aspect or the second aspect. Optionally, the communications apparatus may further include the memory. The memory is configured to store the instructions. Specifically, the communications interface may include a transceiver module, or the communications interface may include a transmitter and a receiver. For details, refer to description of the transceiver module in the communications apparatus and description of the transmitter and the receiver in the communications apparatus in subsequent embodiments.

According to an eighth aspect, this application provides a chip system. The chip system includes a processor, configured to support a first communications apparatus or a second communications apparatus in implementing a function in the foregoing aspect, for example, sending or processing data and/or information in the foregoing method. In a possible design, the chip system further includes a memory. The memory is configured to store program instructions and data that are necessary for the first communications apparatus or the second communications apparatus. The chip system may include a chip, or may include a chip and another discrete device.

BRIEF DESCRIPTION OF DRAWINGS

FIG. 11a is an example schematic diagram of a structure of an X-Permitted option field according to an embodiment of this application;

FIG. 11b is an example schematic diagram of a structure of an ACK-Type option field according to an embodiment of this application;

FIG. 11c is an example schematic diagram of a structure of a PKT.SEQ option field according to an embodiment of this application;

FIG. 12 is an example schematic diagram of a structure of a TACK packet according to an embodiment of this application;

DESCRIPTION OF EMBODIMENTS

Embodiments of this application provide an acknowledgement packet processing method, a communications apparatus, and a storage medium, to reduce an ACK sending frequency and improve data transmission efficiency.

The following describes embodiments of this application with reference to the accompanying drawings.

In the specification, the claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device.

The technical solutions in the embodiments of this application may be applied to various communications systems. The communications systems are applicable to a current communications technology of a mobile network, are also applicable to a future-oriented communications technology, and may be based on the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of a network architecture and the emergence of a new service scenario, the technical solutions provided in the embodiments of this application are also applicable to similar technical problems.

Figure 1:
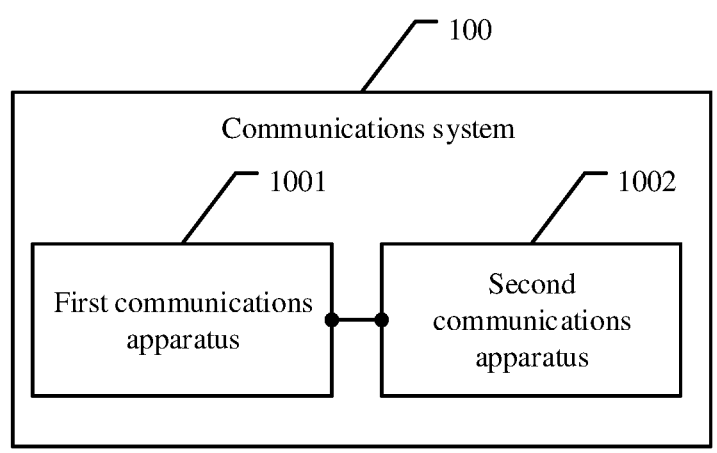
FIG. 1 is an example schematic diagram of a composition structure of a communications system according to an embodiment of this application.

As shown in FIG. 1, a communications system 100 provided in an embodiment of this application includes at least a first communications apparatus 1001 and a second communications apparatus 1002. There is a connection between the first communications apparatus 1001 and the second communications apparatus 1002. For example, the connection may be a wired link, a wireless link, or a link obtained after a wired link and a wireless link are combined. The first communications apparatus 1001 and the second communications apparatus 1002 provided in this embodiment of this application refer to two parties that communicate with each other. For example, the first communications apparatus 1001 and the second communications apparatus 1002 perform data transmission, the first communications apparatus 1001 sends a data packet to the second communications apparatus 1002, and the second communications apparatus 1002 sends an acknowledgement (ACK) packet to the first communications apparatus 1001. The first communications apparatus 1001 may be a data receiver, and the second communications apparatus 1002 may be a data sender. For example, a data packet is sent from a sending node, and arrives at a receiving node. The sending node is referred to as a sender, and the receiving node is referred to as a receiver. The data packet is sent from the sender to the receiver, and the ACK packet is returned from the receiver to the sender.

In an actual application scenario, the first communications apparatus 1001 may be a terminal device, and the second communications apparatus 1002 may be a server. Alternatively, the first communications apparatus 1001 may be a server, and the second communications apparatus 1002 may be a terminal device. Alternatively, each of the first communications apparatus 1001 and the second communications apparatus 1002 may be a terminal device. Alternatively, each of the first communications apparatus 1001 and the second communications apparatus 1002 may be a server. Specifically, implementations of the first communications apparatus 1001 and the second communications apparatus 1002 may be determined with reference to an application scenario. This is not limited herein.

In this embodiment of this application, the first communications apparatus 1001 may perform data transmission by using a plurality of transmission protocols. For example, a TCP packet, a real-time transport protocol (RTP) packet, or a real-time transport control protocol (RTCP) packet may be transmitted between the first communications apparatus 1001 and the second communications apparatus 1002. Specifically, a transmission protocol used for a packet may be determined based on an application scenario. This is not limited herein.

Figure 2:
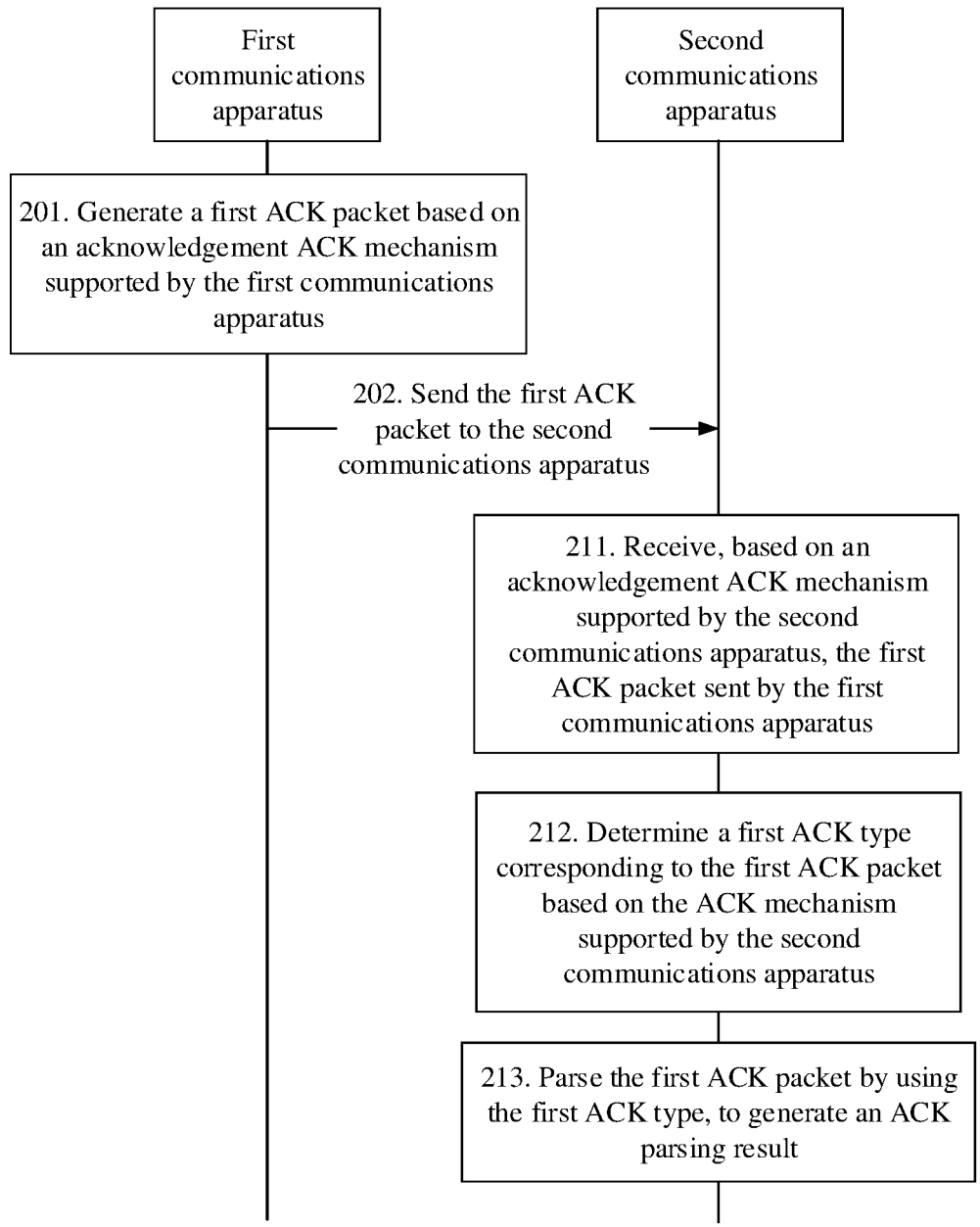
FIG. 2 is an example schematic diagram of an interaction procedure between a first communications apparatus and a second communications apparatus according to an embodiment of this application.

An acknowledgement packet processing method provided in an embodiment of this application is applicable to a scenario in which an ACK packet is transmitted. FIG. 2 is a schematic diagram of an interaction procedure between a first communications apparatus and a second communications apparatus according to an embodiment of this application. Description is provided by using an example in which the first communications apparatus is a data receiver, and the second communications apparatus is a data sender. The first communications apparatus performs subsequent steps 201 and 202, and the second communications apparatus performs subsequent steps 211 to 213. The acknowledgement packet processing method provided in this embodiment of this application mainly includes the following steps.

201. The first communications apparatus generates a first ACK packet based on an acknowledgement ACK mechanism supported by the first communications apparatus, where the ACK mechanism is used to indicate N ACK types corresponding to N ACK packets, a trigger condition required for sending each of the N ACK packets, and feedback information carried in each of the N ACK packets, the first ACK packet is one of the N ACK packets, and N is a positive integer greater than or equal to 2.

In this embodiment of this application, the first communications apparatus may support one or more ACK mechanisms. Each ACK mechanism includes an ACK type, a trigger condition, and feedback information. The ACK type is an ACK type corresponding to an ACK packet. If the ACK mechanism may be used to indicate the N ACK packets, the N ACK packets correspond to the N ACK types, in other words, each ACK packet corresponds to one ACK type. A value of N is a positive integer. For example, the value of N is a positive integer greater than or equal to 2. Specifically, the value of N may be determined based on an application scenario. The N ACK types may specifically include an ACK type 1, an ACK type 2, . . . , and an ACK type N. A type name of each ACK type may be determined based on a specific scenario. This is not limited herein.

It should be noted that in this embodiment of this application, the ACK mechanism indicates an ACK type, a trigger condition, and feedback information corresponding to each of the N ACK packets. Therefore, the first communications apparatus may determine, by determining only an ACK packet indicated in the used ACK mechanism, an ACK type, a trigger condition, and feedback information corresponding to the ACK packet.

Specifically, the trigger condition is a condition required for sending an ACK packet. The ACK mechanism further indicates the trigger condition under which the ACK packet can be sent. If the ACK mechanism may indicate to generate the N ACK packets, each of the N ACK packets corresponds to one trigger condition, namely, a trigger condition under which the corresponding ACK packet can be sent. For example, the value of N is 2. In this case, an ACK packet 1 corresponds to a trigger condition 1, and an ACK packet 2 corresponds to a trigger condition 2. If detecting that the current trigger condition 1 is met, the first communications apparatus generates the ACK packet 1; or if detecting that the current trigger condition 2 is met, the first communications apparatus generates the ACK packet 2. Specific condition content included in the trigger condition is not limited herein. For details, refer to example description in a subsequent embodiment.

It may be understood that in this embodiment of this application, the trigger condition indicated in the ACK mechanism may be used to trigger sending of the ACK packet. The ACK packet needs to be generated before the ACK packet is sent. Alternatively, the trigger condition may be used to trigger generation and sending of the ACK packet. This is not limited herein.

The feedback information is feedback content carried in the ACK packet, and the feedback information is used to indicate a data receiving status of the data receiver. If the ACK mechanism may indicate to generate the N ACK packets, each of the N ACK packets corresponds to one piece of feedback information, namely, specific feedback information content that needs to be carried in each ACK packet. For example, the value of N is 2. In this case, the ACK packet 1 corresponds to feedback information 1, and the ACK packet 2 corresponds to feedback information 2. If detecting that the current feedback information 1 is met, the first communications apparatus generates the ACK packet 1; or if detecting that the current feedback information 2 is met, the first communications apparatus generates the ACK packet 2. Specific content included in the feedback information is not limited herein. For details, refer to example description in a subsequent embodiment.

Selective acknowledgement (SACK) is a TCP acknowledgement mechanism. In the SACK mechanism, a TCP receiver is allowed to separately acknowledge discontinuous segments, to notify a sender of a received packet, so as to acknowledge a packet that is really lost, and the TCP receiver retransmits only a lost segment. A TCP option may be used for the SACK, and a SACK option extends an amount of feedback information in an ACK. In the SACK option, if Type=5, it indicates that this is a selective acknowledgement (SACK) field, and this field occupies 1 byte. Length represents a length of the TCP option, and occupies 1 byte. Each of a left edge and a right edge occupies 4 bytes. Therefore, 10 bytes are used in total. For each newly added block (block), 8 bytes are occupied. A length of a TCP header length field is 4 bits, a maximum decimal value that can be represented is 15, and 15*32/8=60. Therefore, a maximum length of a packet header is 60 bytes, and therefore a maximum length of a TCP option field is 40 bytes. Therefore, the SACK option carries a maximum of four blocks. Actually, some important TCP extension options (for example, a timestamp option, which occupies 10 bytes) are enabled by default in TCP. Therefore, the SACK option usually carries a maximum of three blocks. Due to a length limitation of the TCP option, the SACK option carries a limited quantity of blocks. In an extreme network packet loss and jitter scenario, there are limited benefits. For example, in the case of reverse packet loss, selective repeat cannot be precisely expressed, and an unnecessary retransmission cannot be avoided, leading to a waste of bandwidth.

Compared with the current SACK and a SACK option-based evolution solution, the ACK mechanism provided in this embodiment of this application indicates the ACK type, the trigger condition, and the feedback information corresponding to each of the N ACK packets. Therefore, the first communications apparatus may determine, by determining only the ACK packet indicated in the used ACK mechanism, the ACK type, the trigger condition, and the feedback information corresponding to the ACK packet. In this embodiment of this application, high flexibility of the ACK mechanism is implemented while compatibility with TCP is implemented. Specifically, packet loss detection is performed at the receiver, and the receiver has more comprehensive data packet arrival information than the sender. Therefore, it may be ensured that a packet loss event is accurately detected in a timely manner in the case of a small quantity of ACKs. Once packet loss occurs, the ACK packet defined in this embodiment of this application is used to indicate the sender to retransmit a corresponding data packet, to implement timely packet loss recovery. In addition, all feedback information in the SACK is carried in a packet header, and therefore a very small amount of information can be carried. However, a data field in the ACK packet defined in this embodiment of this application carries richer feedback information, to support a manner of dynamically adjusting an ACK frequency, reduce an ACK sending frequency, and improve data transmission efficiency. It is assumed that a length of each data packet is a maximum segment size (MSS). In this case, in the SACK mechanism, a quantity of ACKs may be reduced by a maximum of 50%. However, in the ACK mechanism provided in this embodiment of this application, the quantity of ACKs may be reduced by at least 95%.

In this embodiment of this application, during generation of the first ACK packet, the first communications apparatus needs to generate the first ACK packet based on the ACK type and the feedback information included in the ACK mechanism supported by the first communications apparatus. In addition, whether a trigger condition required for the first ACK packet is met needs to be further determined before it is determined whether the first ACK packet needs to be generated. Therefore, in this embodiment of this application, the first communications apparatus may control a generation frequency of the ACK packet, and may further determine, based on a requirement, an ACK type of the generated ACK packet and feedback information carried in the ACK packet. A plurality of ACK packets with different functions are flexibly customized, and feedback information carried in various ACK packets is enriched, to support the manner of dynamically adjusting the ACK frequency.

In this embodiment of this application, the first communications apparatus serves as a data receiver, the second communications apparatus serves as a data sender, the second communications apparatus may send a data packet to the first communications apparatus, and the first communications apparatus determines, by using the ACK mechanism supported by the first communications apparatus, whether the ACK packet needs to be generated. If the first communications apparatus determines that the ACK packet may be generated, the first communications apparatus generates the first ACK packet based on the ACK mechanism. The first ACK packet generated by the first communications apparatus is one of the N ACK packets, and an ACK packet that is the first ACK packet and that is in the N ACK packets is not limited herein. After the first communications apparatus generates the first ACK packet, the first communications apparatus triggers execution of subsequent step 202.

In some embodiments of this application, the first ACK packet generated by the first communications apparatus includes a first ACK type and first feedback information, and the first ACK type is one of the N ACK types.

If the trigger condition of the first ACK packet is met, the first communications apparatus may generate the first ACK packet based on the ACK mechanism supported by the first communications apparatus. The ACK mechanism indicates the ACK type and the feedback information. Therefore, the first ACK packet generated by the first communications apparatus may include the first ACK type and the first feedback information. The first ACK type is an ACK type corresponding to the first ACK packet, and the first ACK type is one of the N ACK types. The first feedback information is feedback information carried in the first ACK packet. Feedback information content that needs to be carried in the first feedback information may be determined based on a specific ACK mechanism. This is not limited herein. The first ACK packet generated by the first communications apparatus carries the first ACK type and the first feedback information. Therefore, the second communications apparatus that receives the first ACK packet may determine the ACK type to which the first ACK packet belongs and specific feedback information content carried in the first ACK packet, and accordingly the second communications apparatus may determine whether the first communications apparatus receives a data packet sent by the second communications apparatus and a feedback status of the first communications apparatus for the received data packet.

Figure 3:
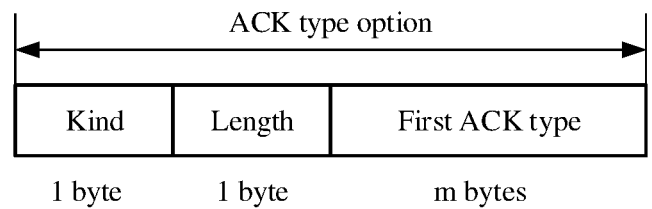
FIG. 3 is an example schematic diagram of a composition structure of an ACK type option according to an embodiment of this application.

In some embodiments of this application, FIG. 3 is a schematic diagram of a composition structure of an ACK type option according to an embodiment of this application. The first ACK packet includes the ACK type option.

A size of the ACK type option (ACK type option) is (2+m) bytes, where a value of m is a positive integer, and the value of m is positively correlated with the value of N.

One of the (2+m) bytes is used to indicate a kind (kind) of the ACK type option (ACK type option), another byte in the (2+m) bytes is used to indicate a length (length) of the ACK type option (ACK type option), and the remaining m bytes in the (2+m) bytes are used to indicate the first ACK type (ACK type).

Specifically, the ACK type option may occupy (2+m) bytes, and the value of m is not limited. A larger value of a quantity N of ACK packets that need to be indicated in the ACK mechanism indicates a larger value of m, and a smaller value of the quantity N of ACK packets that need to be indicated in the ACK mechanism indicates a smaller value of m.

The ACK type option in the first ACK packet may be used to indicate the first ACK type corresponding to the first ACK packet. For example, the ACK type option may include the following three parts: a kind (kind) field, a length (length) field, and an ACK type (ACK type) field. Each of the kind (kind) field and the length (length) field occupies 1 byte, and the ACK type (ACK type) field occupies m bytes. The ACK type (ACK type) field may be used to indicate that the ACK type corresponding to the first ACK packet is the first ACK type. Therefore, the first communications apparatus may add the first ACK type to the ACK type (ACK type) field, so that the second communications apparatus determines the first ACK type based on a specific value of the ACK type field in the ACK type option.

In some embodiments of this application, the first feedback information is feedback information carried in the first ACK packet. The first ACK packet further includes a data field; and the data field carries at least a part of the first feedback information. The first feedback information may include a plurality of pieces of feedback sub-information, and a part or all of the first feedback information may be carried in the data field. Therefore, an amount of information carried in the data field is increased, and transmission efficiency of the feedback information is improved. In addition, the data field may further carry a plurality of types of richer feedback information. Therefore, in this embodiment of this application, an amount of information carried in the ACK packet is increased.

It should be noted that in this embodiment of this application, the first ACK packet includes a packet header field and the data field. The packet header field is used to carry packet header information, and the data field may be used to carry at least a part of the first feedback information. In the first ACK packet, the packet header field and the data field may be determined through division based on a size of a length field in the packet header field in the first ACK packet. For example, the packet header field corresponding to a length value of the length field is determined from the first ACK packet, and a part other than the packet header field in the first ACK packet is the data field.

Figure 4:
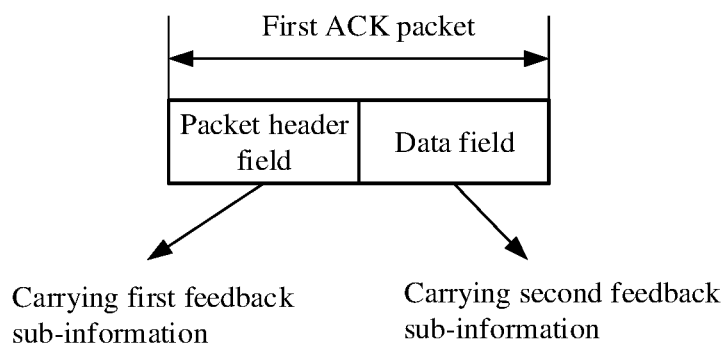
FIG. 4 is an example schematic diagram of a composition structure of a first ACK packet according to an embodiment of this application.

In some embodiments of this application, the first feedback information includes first feedback sub-information and second feedback sub-information. FIG. 4 is a schematic diagram of a composition structure of the first ACK packet according to an embodiment of this application.

The first ACK packet includes the packet header field (header field) and the data field (data field).

The packet header field carries the first feedback sub-information.

The data field carries the second feedback sub-information.

The first feedback information may include a plurality of types of feedback content. The first ACK packet carries the first feedback information, and based on different locations at which the first feedback information is carried in the first ACK packet, the first feedback information may be divided into the first feedback sub-information and the second feedback sub-information. Composition content of the first feedback sub-information and the second feedback sub-information is not limited herein. For example, the first feedback information may include an acknowledgement sequence number, delay information, and jitter information. In this case, the first feedback sub-information may be the acknowledgement sequence number, and the second feedback sub-information may be the delay information and the jitter information. Feedback information carried in a packet header field and a data field in an ACK packet may vary with a type of the ACK packet. In this embodiment of this application, both the packet header field and the data field in the ACK packet may carry the feedback information. Therefore, in this embodiment of this application, the ACK packet carries rich feedback information, and the amount of information carried in the ACK packet is increased.

In some embodiments of this application, before step 201 of generating, by the first communications apparatus, a first ACK packet based on an acknowledgement ACK mechanism supported by the first communications apparatus, the acknowledgement packet processing method provided in this embodiment of this application further includes:

The first communications apparatus sends a first negotiation packet to the second communications apparatus, where the first negotiation packet is used to indicate the ACK mechanism supported by the first communications apparatus;

the first communications apparatus receives a second negotiation packet sent by the second communications apparatus, where the second negotiation packet is used to indicate an ACK mechanism supported by the second communications apparatus; and when the first communications apparatus and the second communications apparatus use ACK mechanisms that match each other, execution of step 201 of generating, by the first communications apparatus, a first ACK packet based on an acknowledgement ACK mechanism supported by the first communications apparatus is triggered.

Before the first communications apparatus starts to transmit data and send the acknowledgement packet to the second communications apparatus, the first communications apparatus and the second communications apparatus may further first perform negotiation of the ACK mechanisms supported by the first communications apparatus and the second communications apparatus. For example, the two communication parties (e.g., the first communications apparatus and the second communications apparatus) perform link establishment and negotiation through handshake. In a process of constructing the negotiation packet, the first communications apparatus indicates, by using the negotiation packet, that the first communications apparatus supports a specified ACK mechanism. In a process of constructing the negotiation packet, the second communications apparatus indicates, by using the negotiation packet, whether the second communications apparatus supports the specified ACK mechanism. If both the first communications apparatus and the second communications apparatus support the same ACK mechanism, negotiation between the first communications apparatus and the second communications apparatus succeeds, and in a subsequent data packet transmission process, the ACK mechanism is used to send and receive an ACK packet. If negotiation between the first communications apparatus and the second communications apparatus fails, the solution provided in this embodiment of this application is not used to send and receive an ACK packet. Both of the two communication parties send the negotiation packets to perform negotiation of the ACK mechanism, and therefore the two communication parties can correctly send and receive the ACK packet.

Figure 5:
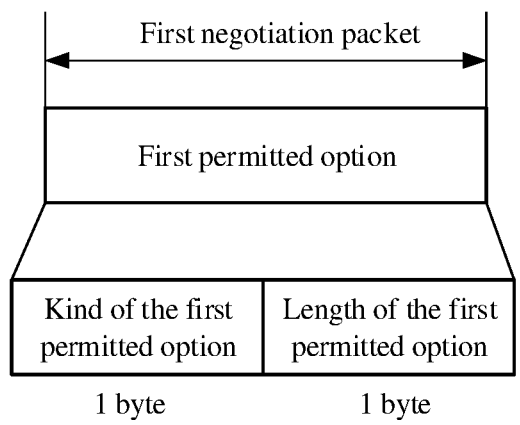
FIG. 5 is an example schematic diagram of a composition structure of a first negotiation packet according to an embodiment of this application.
Figure 6:
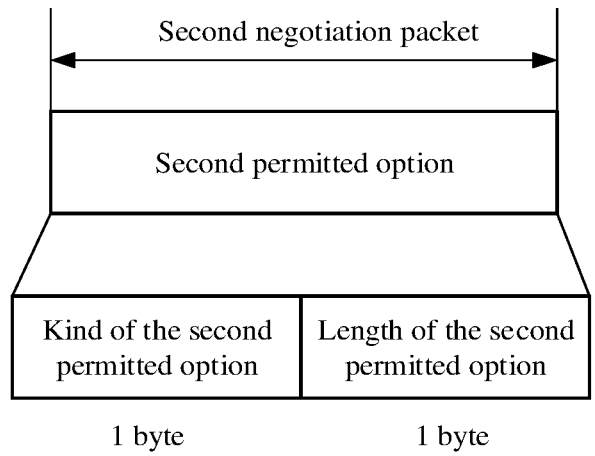
FIG. 6 is an example schematic diagram of a composition structure of a second negotiation packet according to an embodiment of this application.

In some embodiments of this application, FIG. 5 is a schematic diagram of a composition structure of the first negotiation packet according to an embodiment of this application, and FIG. 6 is a schematic diagram of a composition structure of the second negotiation packet according to an embodiment of this application. The first negotiation packet includes a first permitted option, and the second negotiation packet includes a second permitted option.

A size of the first permitted option is 2 bytes, one byte in the first permitted option is used to indicate a kind of the first permitted option, and the other byte in the first permitted option is used to indicate a length (length) of the first permitted option.

A size of the second permitted option is 2 bytes, one byte in the second permitted option is used to indicate a kind of the second permitted option, and the other byte in the second permitted option is used to indicate a length of the second permitted option.

The composition structures of the first negotiation packet and the second negotiation packet are similar. Description is provided below by using the first negotiation packet as an example. As shown in FIG. 5, the size of the first permitted option is 2 bytes, and each of a kind field and a length field occupies 1 byte. One byte in the first permitted option is used to indicate the kind of the first permitted option, and the other byte in the first permitted option is used to indicate the length of the first permitted option. The first negotiation packet may be indicated by using the first permitted option. Therefore, the first communications apparatus may add an ACK mechanism supported by the first communications apparatus to the first permitted option in the first negotiation packet, so that after receiving the first negotiation packet, the second communications apparatus may determine, by parsing the first permitted option, the ACK mechanism supported by the first communications apparatus. Similarly, after receiving the second negotiation packet, the first communications apparatus may determine, by parsing the second permitted option, an ACK mechanism supported by the second communications apparatus. Both of the two communication parties send the negotiation packets, so that negotiation of the ACK mechanism may be completed, to ensure that the two communication parties send and receive the ACK packet by using the same ACK mechanism.

A manner in which the first communications apparatus generates the ACK packet by using TCP is described below by using an example. Identification and negotiation of a plurality of ACK packets are performed in a TCP option field. As shown in Table 1, a related option field added to the TCP option field is described.

| Type | Length | Name | Description |
| --- | --- | --- | --- |
| i | 2 bytes | X-Permitted | In an SYN packet, used to indicate that an acknowledgement mechanism X is supported |
| j | (2 + m) bytes | ACK-Type | A value of an m-byte value field indicates a current ACK type |

In a process of implementing the ACK mechanism provided in this embodiment of this application in TCP, an identification process and a negotiation process of the ACK are as follows:

An identification function of the ACK packet is first described. A plurality of different ACK packets are identified by adding an ACK type option to a TCP packet. In a possible implementation of this embodiment of this application, a plurality of different ACK packets are identified by adding the "ACK type option (ACK-Type)" to the TCP packet, and an ACK type is indicated in the ACK type option by using m bytes. For example, a TLV (Type-Length-Value) data structure in the TCP option field is used for the ACK type option.

In a possible implementation of this embodiment of this application, the ACK type option is placed in the TCP option field, to implement compatibility with TCP. As shown in Table 1, the "ACK type option" of (2+m) (m≥1, and m is an integer) bytes is added to the TCP option field. This option field includes not only a value of a 1-byte type field and a value of a 1-byte length field, but also a value of an m-byte value field used to indicate the ACK type.

A negotiation function of the ACK is described below. For example, a 2-byte permitted option (represented by X-Permitted) is added to a synchronize sequence number (synchronize sequence numbers, SYN) packet, to indicate that the communications apparatus (for example, the first communications apparatus or the second communications apparatus) supports a specified ACK mechanism (represented by a symbol X). The negotiation process may occur at a transport layer or at a layer above a transport layer, for example, a session layer and an application layer. In addition, the negotiation process may occur in a link establishment phase, or may occur in a data transmission process. This is not limited in embodiments of this application.

In a possible implementation, the permitted option is placed in the TCP option field, to implement compatibility with TCP. As shown in Table 1, the permitted option is used to perform negotiation of the ACK mechanism during a TCP three-way handshake, and this field is carried in the SYN packet.

It should be noted that in the foregoing example description, in TCP, the permitted option may be carried in the SYN packet, and the ACK type option may be carried in the ACK packet. In Table 1, i and j are type identifiers, are a part of a field, and are used to identify whether this field is the ACK type option or the permitted option.

In some embodiments of this application, a trigger condition for generating the first ACK packet includes at least one of the following:

sending the first ACK packet based on a preset ACK sending frequency, and sending the first ACK packet when a preset instant event occurs.

Trigger conditions respectively corresponding to the N ACK packets may be indicated in the ACK mechanism. Description is provided by using the trigger condition for generating the first ACK packet as an example. There may be two types of trigger conditions: an ACK sending frequency and an instant event. The ACK sending frequency is a sending frequency for sending an ACK, and the ACK packet can be generated and sent only when the ACK sending frequency is met. For example, the ACK sending frequency may be that the ACK packet is sent each time there is an interval of a specific time period. Alternatively, the ACK sending frequency may be that the ACK packet is sent each time a specific quantity of data packets are received. The instant event is event information that can trigger sending of the ACK packet. The ACK packet can be generated and sent only when the instant event indicated in the ACK mechanism occurs. The instant event may alternatively be configured based on a specific application scenario. For example, the instant event may be a packet loss event or an event that a receive buffer is full. Based on the trigger condition, in this embodiment of this application, the ACK packet may be generated based on a requirement, and therefore the ACK packet may be dynamically adjusted.

In some embodiments of this application, the sending the first ACK packet based on a preset ACK sending frequency includes at least one of the following: sending the first ACK packet each time a preset quantity of data packets are received, and sending the first ACK packet each time a preset time period passes.

The ACK sending frequency may be used as the trigger condition for sending the first ACK packet, and the sending the first ACK packet based on a preset ACK sending frequency may include: sending the first ACK packet each time the preset quantity of data packets are received. For example, the first communications apparatus that serves as a receiver immediately returns the first ACK packet each time Y (Y>1) data packets are received, and the first communications apparatus may count, in real time starting from a time in which the first ACK packet is sent, a quantity of data packets received by the first communications apparatus, and determine, based on the quantity of received data packets, whether to send the first ACK packet. In addition, the sending the first ACK packet based on a preset ACK sending frequency may further include: sending the first ACK packet each time the preset time period passes. For example, the first communications apparatus serves as a receiver, and the first communications apparatus starts timing when sending the first ACK packet, and sends another first ACK packet after the preset time period passes. Therefore, in this implementation scenario, regardless of whether there is a data packet that arrives at the first communications apparatus, the first communications apparatus needs to send the first ACK packet based on the preset time period. Based on the trigger condition, in this embodiment of this application, the ACK packet may be generated based on a requirement, and therefore the ACK packet may be dynamically adjusted.

Manners of sending the ACK packet under different trigger conditions are described below by using examples. The trigger condition in this embodiment of this application may be obtained after one or more of the following manners are combined.

In this embodiment of this application, in a possible manner, when no packet loss or disorder occurs, no ACK packet is returned.

Figure 7A:
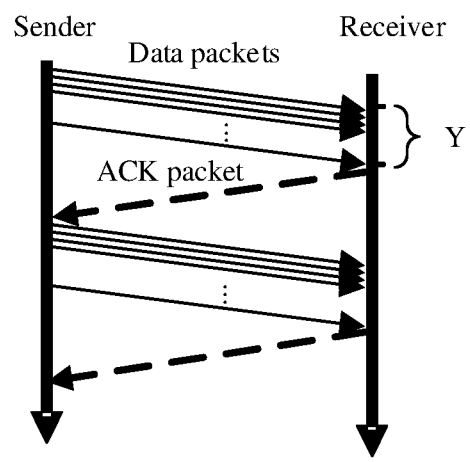
FIG. 7a to FIG. 7c are example schematic diagrams of three manners of setting a trigger condition according to an embodiment of this application.
Figure 7B:
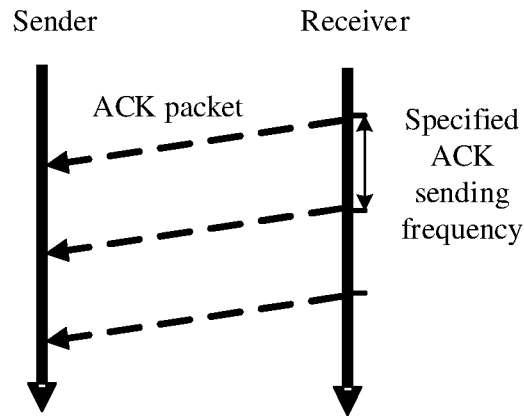
Figure 7C:
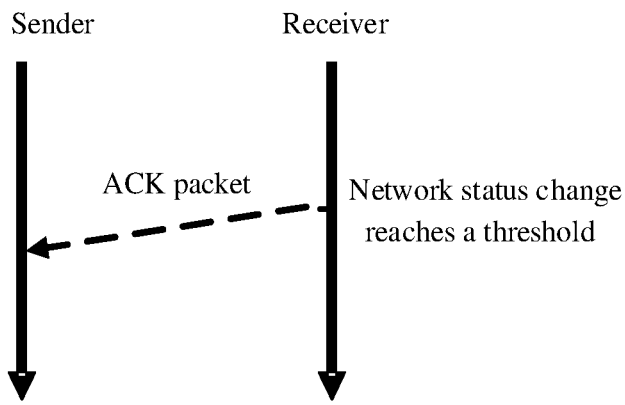

In a possible manner, as shown in FIG. 7a, the first communications apparatus that serves as a receiver immediately returns the ACK packet each time Y (Y>1) data packets are received. In another possible manner, as shown in FIG. 7b, regardless of whether there is a data packet that arrives, the first communications apparatus serves as a receiver, and the first communications apparatus returns the ACK packet based on a specified ACK sending frequency. In another possible manner, as shown in FIG. 7c, the first communications apparatus serves as a receiver, and the first communications apparatus returns the ACK packet based on a requirement and based on a network status change, for example, information indicating that a delay or bandwidth change reaches a threshold, a packet loss rate, a quantity of lost packets, or a disorder degree reaches a threshold, or a remaining capacity of the receive buffer reaches a threshold. Another possible manner may be the manners of FIG. 7a to FIG. 7c. That is, when any one or more of the following conditions, namely, "each time Y (Y>1) data packets are received," "there is an interval of a time period," and "a network status change reaches a threshold," is met, the ACK packet is returned.

Further, in some embodiments of this application, the first communications apparatus performs communication through a connection between the first communications apparatus and the second communications apparatus, and the sending the first ACK packet each time a preset quantity of data packets are received includes:

The first communications apparatus obtains a bandwidth and delay product (bandwidth and delay product) of the connection between the first communications apparatus and the second communications apparatus; and when the bandwidth and delay product is less than a preset threshold, sends the first ACK packet each time the preset quantity of data packets are received; or when the bandwidth and delay product is less than or equal to a preset threshold, sends the first ACK packet each time the preset quantity of data packets are received.

In this embodiment of this application, the first communications apparatus may further determine an ACK sending frequency based on the bandwidth and delay product of the connection, and the first communications apparatus may calculate the ACK sending frequency based on whether the bandwidth and delay product is less than the preset threshold. The bandwidth and delay product is a product of maximum bandwidth of the connection between the first communications apparatus and the second communications apparatus and a minimum round-trip time. Only when the bandwidth and delay product meets a preset threshold condition, the first ACK packet can be sent each time the preset quantity of data packets are received. The threshold condition may be that the bandwidth and delay product is less than the preset threshold, or the bandwidth and delay product is less than or equal to the preset threshold. A value of the threshold is not limited. In this embodiment of this application, the first communications apparatus may determine the ACK sending frequency based on whether the bandwidth and delay product is less than the threshold. In this way, the ACK packet is generated based on a requirement, and therefore the ACK packet may be dynamically adjusted.

It should be noted that the first communications apparatus performs communication through the connection between the first communications apparatus and the second communications apparatus. The connection may be used to send a data packet and a control packet. In addition, the connection may include a data link and a control link, and the communication includes sending a data packet, and further includes sending a control packet, for example, various ACK packets in this specification. The data link may be configured to send a data packet, and the control link may be configured to send a control packet.

Further, in some embodiments of this application, the threshold is β×L×MSS, and the preset quantity is L×MSS, where β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents the minimum round-trip time between the first communications apparatus and the second communications apparatus.

In some embodiments of this application, the first communications apparatus performs communication through a connection between the first communications apparatus and the second communications apparatus, and the sending the first ACK packet each time a preset time period passes includes:

The first communications apparatus obtains a bandwidth and delay product of the connection between the first communications apparatus and the second communications apparatus; and when the bandwidth and delay product is greater than or equal to a preset threshold, sends the first ACK packet each time the preset time period passes; or when the bandwidth and delay product is greater than a preset threshold, sends the first ACK packet each time the preset time period passes.

In this embodiment of this application, the first communications apparatus may further determine an ACK sending frequency based on the bandwidth and delay product of the connection, and the first communications apparatus may calculate the ACK sending frequency based on whether the bandwidth and delay product is greater than the preset threshold. The bandwidth and delay product is a product of maximum bandwidth of the connection between the first communications apparatus and the second communications apparatus and a minimum round-trip time. Only when the bandwidth and delay product meets a preset threshold condition, the first ACK packet can be sent each time the preset time period passes. The threshold condition may be that the bandwidth and delay product is greater than the preset threshold, or the bandwidth and delay product is greater than or equal to the preset threshold. A value of the threshold is not limited. In this embodiment of this application, the first communications apparatus may determine the ACK sending frequency based on whether the bandwidth and delay product is greater than the threshold. In this way, the ACK packet is generated based on a requirement, and therefore the ACK packet may be dynamically adjusted.

Further, in some embodiments of this application, the threshold is β×L×MSS, and the preset time period is $$\frac{RTT\min}{\beta},$$

where

β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents the minimum round-trip time between the first communications apparatus and the second communications apparatus.

A process of calculating, by the first communications apparatus, the ACK sending frequency based on the bandwidth and delay product is described below by using an example.

For example, when the bandwidth and delay product is greater than or equal to β×L×MSS, the ACK sending frequency is that β ACKs are sent each time $RTT_{min}$ passes, in other words, when the bandwidth and delay product is greater than the specified threshold (for example, β×L×MSS), one ACK packet is sent each time specified duration (for example, $$\frac{RTT\min}{\beta})$$

passes.

When the bandwidth and delay product is less than β×L×MSS, the ACK sending frequency is that one ACK packet is sent each time L×MSS data packets are received, in other words, when the bandwidth and delay product is less than the specified threshold, one ACK packet is sent each time a specified quantity (for example, L×MSS) of data packets are received.

In some embodiments of this application, that the first communications apparatus obtains a bandwidth and delay product of the connection between the first communications apparatus and the second communications apparatus includes:

The first communications apparatus obtains the maximum bandwidth (maximum bandwidth) of the connection between the first communications apparatus and the second communications apparatus and the minimum round-trip time between the first communications apparatus and the second communications apparatus, and determines that the bandwidth and delay product is equal to a result obtained by multiplying the maximum bandwidth and the minimum round-trip time; or the first communications apparatus obtains average bandwidth of the connection between the first communications apparatus and the second communications apparatus and an average round-trip time between the first communications apparatus and the second communications apparatus, and determines that the bandwidth and delay product is equal to a result obtained by multiplying the average bandwidth and the average round-trip time.

There are a plurality of methods for calculating the bandwidth and delay product. For example, the first communications apparatus may use the result obtained by multiplying the maximum bandwidth and the minimum round-trip time as the bandwidth and delay product. For another example, the first communications apparatus may use the result obtained by multiplying the average bandwidth and the average round-trip time as the bandwidth and delay product. The first communications apparatus may calculate the bandwidth and delay product in each of the plurality of calculation manners. Therefore, the first communications apparatus may determine the ACK sending frequency based on whether the bandwidth and delay product is less than the threshold. In this way, the ACK packet is generated based on a requirement, and therefore the ACK packet may be dynamically adjusted.

In some embodiments of this application, the instant event includes at least one of the following: a packet loss event and an event that a receive buffer of the first communications apparatus has no remaining capacity.

The first communications apparatus may customize a plurality of instant events in the ACK mechanism, for example, the packet loss event and the event that the receive buffer of the first communications apparatus has no remaining capacity. That a receive buffer has no remaining capacity means that the receive buffer of the first communications apparatus is full. For example, the first communications apparatus that serves as a receiver may generate the ACK packet based on a requirement and based on a network status change, for example, information indicating that a delay or bandwidth change reaches a threshold, a packet loss rate, a quantity of lost packets, or a disorder degree reaches a threshold, or a remaining capacity of the receive buffer reaches a threshold. In this embodiment of this application, the first communications apparatus may send the ACK packet based on the customized instant event. In this way, the ACK packet is generated based on a requirement, and therefore the ACK packet may be dynamically adjusted.

In some embodiments of this application, the feedback information carried in each of the N ACK packets includes at least one of the following: delay information of the connection between the first communications apparatus and the second communications apparatus, bandwidth information of the connection between the first communications apparatus and the second communications apparatus, jitter information of the connection between the first communications apparatus and the second communications apparatus, packet loss information of the connection between the first communications apparatus and the second communications apparatus information, and status flag information of the connection between the first communications apparatus and the second communications apparatus.

Specifically, in this embodiment of this application, the first communications apparatus may flexibly customize a plurality of types of feedback information in the ACK mechanism. Therefore, the first ACK packet generated by the first communications apparatus may carry various types of feedback information, so that the second communications apparatus may receive a plurality of types of feedback information sent by the first communications apparatus, to implement more comprehensive information feedback.

In this embodiment of this application, the ACK carries a plurality of types of feedback information. The feedback information may be delay-related information carried in the ACK. The delay-related information includes one or more of a round-trip time, a one-way delay, a queueing delay, a cutoff time, and the like. The one-way delay is a delay between a time in which the sender sends a packet and a time in which the receiver receives the packet. When data is queued in a buffer of a communications apparatus for processing, the queueing delay is generated, and the queueing delay is generated on a bottleneck link.

The feedback information may further be bandwidth-related information carried in the ACK. The bandwidth-related information includes one or more of a sending rate, a receiving rate, network bandwidth, and the like.

The feedback information may further be jitter-related information carried in the ACK. The jitter-related information includes one or more of a delay jitter, a bandwidth jitter, and the like.

The feedback information may further be packet loss information carried in the ACK. ACKs that carry the packet loss information may be further classified into an ACK packet that carries latest packet loss information and an ACK packet that carries redundant historical packet loss information. The packet loss information is an interval between discontinuous data segment sequences in the receive buffer of the receiver. For example, if the receive buffers five packets (2, 5, 6, 8, and 9), latest packet loss information is a sequence number of a packet 7, and historical packet loss information is sequence numbers of three packets 1, 3, and 4. The packet loss information represented by using the sequence numbers may be encoded to reduce a quantity of bytes carried in the ACK. In this embodiment of this application, a used encoding manner and whether encoding is performed are not limited.

The feedback information may further be other network status information carried in the ACK, and includes one or more of an amount of data that is received in the receive buffer and that is not submitted to an upper-layer application, a size of the remaining capacity of the buffer of the receiver, a disorder degree, a control parameter used by the sender to make a decision, and the like. For example, the feedback information may further be flag information carried in the ACK. The control parameter used by the sender to make a decision may be a threshold parameter or a flag used to indicate a status.

Figure 8:
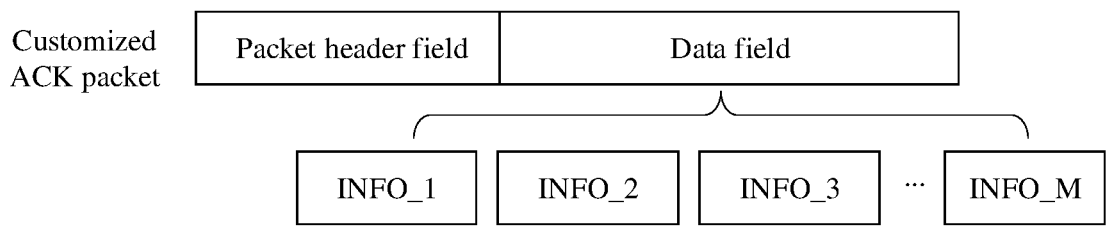
FIG. 8 is an example schematic diagram of a structure of a customized ACK packet according to an embodiment of this application.

A method for adding the feedback information to the data field in the ACK packet is described below by using an example. FIG. 8 is a schematic diagram of a structure of a customized ACK packet according to an embodiment of this application. The ACK packet includes a packet header field and a data field. The packet header field may also be referred to as a packet header, and the data field may also be referred to as a data part. The data field may include INFO_1, INFO_2, INFO_3, . . . , and INFO_M, in other words, the data field may include M subfields. In the customized ACK packet, in addition to a required field in the packet header, the data part is allowed to carry more feedback information. The information includes but is not limited to a delay, bandwidth, a jitter, a packet sequence number, an amount of data, and the like. Feedback information carried in a data part in an ACK varies with a type of the ACK. For details, refer to the description of the feedback information in the foregoing embodiment.

In some embodiments of this application, before step 201 of generating, by the first communications apparatus, a first ACK packet based on an acknowledgement ACK mechanism supported by the first communications apparatus, the acknowledgement packet processing method provided in this embodiment of this application includes:

The first communications apparatus receives a first data packet sent by the second communications apparatus, where the first data packet carries data content and a first packet sequence number (packet number), and when the first communications apparatus determines that the first data packet is lost, the first ACK packet is used to indicate that the first data packet is lost; and the first communications apparatus receives a second data packet sent by the second communications apparatus, where the second data packet carries the data content and a second packet sequence number, and the second packet sequence number and the first packet sequence number are different packet sequence numbers.

The second communications apparatus may send the first data packet to the first communications apparatus. The first data packet carries the data content and the first packet sequence number, and a different packet sequence number is carried in each data packet sent by the second communications apparatus. For example, a data packet sent by the second communications apparatus to the first communications apparatus carries a packet sequence number, and the packet sequence number monotonically increases. That is, each time the second communications apparatus sends a data packet, the data packet may carry a packet sequence number, and a packet sequence number in a data packet that is currently sent is greater than a packet sequence number in a data packet that is previously sent.

Before the first communications apparatus determines whether to generate the first ACK packet, the first communications apparatus may receive the first data packet sent by the second communications apparatus. When the first communications apparatus determines that the first data packet is lost, the first communications apparatus generates the first ACK packet. The first ACK packet is used to indicate that the first data packet is lost. The second communications apparatus receives the first ACK packet sent by the first communications apparatus, and the second communications apparatus determines, based on the first ACK packet, that the first data packet is lost. Therefore, the second communications apparatus needs to retransmit the data content carried in the first data packet. In this case, the second communications apparatus generates the second data packet. The second data packet carries the data content and the second packet sequence number. The second packet sequence number and the first packet sequence number are different packet sequence numbers. For example, the second packet sequence number is a packet sequence number that is increased based on the first packet sequence number. The first communications apparatus receives the second data packet sent by the second communications apparatus, and the first communications apparatus may determine, based on the second packet sequence number carried in the second data packet, a data packet that is lost and retransmitted, to improve packet loss recovery efficiency.

For example, the first communications apparatus is a receiver, and the first communications apparatus receives a data packet sent by the second communications apparatus. If the data packet is lost, the data packet is retransmitted, and the retransmitted packet may be lost. To successfully detect a quantity of lost retransmitted packets on a first communications apparatus side, a strictly increasing packet sequence number (represented by PKT.SEQ) is introduced in this embodiment of this application, and is used as an attribute of each packet. In other words, a packet sequence number PKT.SEQ of a packet that is previously sent is less than a packet sequence number PKT.SEQ of a packet that is currently sent. With reference to the new data packet attribute PKT.SEQ, when receiving a packet loss-driven ACK packet, the second communications apparatus that serves as a sender may clearly know a specific data packet (including whether the data packet is a retransmitted packet) that is lost, to improve packet loss recovery efficiency.

202. The first communications apparatus sends the first ACK packet to the second communications apparatus.

In this embodiment of this application, after the first communications apparatus generates the first ACK packet, the first communications apparatus may send the first ACK packet to the second communications apparatus, so that the second communications apparatus may receive the first ACK packet, and determine, based on the received first ACK packet, whether the first communications apparatus receives a data packet sent by the second communications apparatus and a feedback status of the first communications apparatus for the received data packet.

211. The second communications apparatus receives, based on the acknowledgement ACK mechanism supported by the second communications apparatus, the first ACK packet sent by the first communications apparatus, where the ACK mechanism is used to indicate N ACK types corresponding to N ACK packets and feedback information carried in each of the N ACK packets, the first ACK packet is one of the N ACK packets, and N is a positive integer greater than or equal to 2.

In this embodiment of this application, the second communications apparatus and the first communications apparatus need to use ACK mechanisms that match each other, to implement ACK feedback between the second communications apparatus and the first communications apparatus. For example, if the first communications apparatus sends the first ACK packet by using the ACK mechanism supported by the first communications apparatus, the second communications apparatus also needs to support the ACK mechanism used by the first communications apparatus. On the contrary, when the second communications apparatus does not support the ACK mechanism used by the first communications apparatus, the second communications apparatus cannot correctly receive the first ACK packet sent by the first communications apparatus.

It should be noted that in this embodiment of this application, the ACK mechanism indicates an ACK type and feedback information corresponding to each of the N ACK packets. Therefore, the first communications apparatus may determine, by determining only an ACK packet indicated in the used ACK mechanism, an ACK type and feedback information corresponding to the ACK packet. Therefore, an ACK sending frequency can be reduced, and data transmission efficiency can be improved.

In this embodiment of this application, the second communications apparatus can support one or more ACK mechanisms. Each ACK mechanism includes at least an ACK type and feedback information. The ACK type is an ACK type corresponding to an ACK packet. If the ACK mechanism may be used to indicate the N ACK packets, the N ACK packets correspond to the N ACK types, in other words, each ACK packet corresponds to one ACK type. A value of N is a positive integer. For example, the value of N is a positive integer greater than or equal to 2. Specifically, the value of N may be determined based on an application scenario. The N ACK types may specifically include an ACK type 1, an ACK type 2, . . . , and an ACK type N. A type name of each ACK type may be determined based on a specific scenario. This is not limited herein.

The feedback information is feedback content carried in the ACK packet, and the feedback information is used to indicate a data receiving status of the data receiver. If the ACK mechanism may indicate to generate the N ACK packets, each of the N ACK packets corresponds to one piece of feedback information, namely, specific feedback information content that needs to be carried in each ACK packet. For example, the value of N is 2. In this case, an ACK packet 1 corresponds to feedback information 1, and an ACK packet 2 corresponds to feedback information 2. If detecting that the current feedback information 1 is met, the first communications apparatus generates the ACK packet 1; or if detecting that the current feedback information 2 is met, the first communications apparatus generates the ACK packet 2. Specific content included in the feedback information is not limited herein. For details, refer to the example description of the feedback information in the foregoing embodiment.

In some embodiments of this application, before step 211 of receiving, by the second communications apparatus based on the acknowledgement ACK mechanism supported by the second communications apparatus, the first ACK packet sent by the first communications apparatus, the acknowledgement packet processing method provided in this embodiment of this application further includes:

The second communications apparatus receives the first negotiation packet sent by the first communications apparatus, where the first negotiation packet is used to indicate the ACK mechanism supported by the first communications apparatus;

the second communications apparatus sends the second negotiation packet to the first communications apparatus, where the second negotiation packet is used to indicate the ACK mechanism supported by the second communications apparatus; and when the first communications apparatus and the second communications apparatus use ACK mechanisms that match each other, execution of the following step of: receiving, by the second communications apparatus based on the acknowledgement ACK mechanism supported by the second communications apparatus, the first ACK packet sent by the first communications apparatus is triggered.

Before the first communications apparatus starts to transmit data and send the acknowledgement packet to the second communications apparatus, the first communications apparatus and the second communications apparatus may further first perform negotiation of the ACK mechanisms supported by the first communications apparatus and the second communications apparatus. For example, the two communication parties (e.g., the first communications apparatus and the second communications apparatus) perform link establishment and negotiation through handshake. In a process of constructing the negotiation packet, the first communications apparatus indicates, by using the negotiation packet, that the first communications apparatus supports a specified ACK mechanism. In a process of constructing the negotiation packet, the second communications apparatus indicates, by using the negotiation packet, whether the second communications apparatus supports the specified ACK mechanism. If both the first communications apparatus and the second communications apparatus support the same ACK mechanism, negotiation between the first communications apparatus and the second communications apparatus succeeds, and in a subsequent data packet transmission process, the ACK mechanism is used to send and receive an ACK packet. If negotiation between the first communications apparatus and the second communications apparatus fails, the solution provided in this embodiment of this application is not used to send and receive an ACK packet. Both of the two communication parties send the negotiation packets to perform negotiation of the ACK mechanism, and therefore the two communication parties can correctly send and receive the ACK packet.

In some embodiments of this application, before step 211 of receiving, by the second communications apparatus based on the acknowledgement ACK mechanism supported by the second communications apparatus, the first ACK packet sent by the first communications apparatus, the acknowledgement packet processing method provided in this embodiment of this application further includes:

The second communications apparatus sends the first data packet to the first communications apparatus, where the first data packet carries the data content and the first packet sequence number; and when the second communications apparatus determines, based on the first ACK packet, that the first data packet is lost, the second communications apparatus sends the second data packet to the first communications apparatus, where the second data packet carries the data content and the second packet sequence number, and the second packet sequence number and the first packet sequence number are different packet sequence numbers.

The second communications apparatus may send the first data packet to the first communications apparatus. The first data packet carries the data content and the first packet sequence number, and a different packet sequence number is carried in each data packet sent by the second communications apparatus. For example, a data packet sent by the second communications apparatus to the first communications apparatus carries a packet sequence number, and the packet sequence number monotonically increases. That is, each time the second communications apparatus sends a data packet, the data packet may carry a packet sequence number, and a packet sequence number in a data packet that is currently sent is greater than a packet sequence number in a data packet that is previously sent.

Before the first communications apparatus determines whether to generate the first ACK packet, the first communications apparatus may receive the first data packet sent by the second communications apparatus. When the first communications apparatus determines that the first data packet is lost, the first communications apparatus generates the first ACK packet. The first ACK packet is used to indicate that the first data packet is lost. The second communications apparatus receives the first ACK packet sent by the first communications apparatus, and the second communications apparatus determines, based on the first ACK packet, that the first data packet is lost. Therefore, the second communications apparatus needs to retransmit the data content carried in the first data packet. In this case, the second communications apparatus generates the second data packet. The second data packet carries the data content and the second packet sequence number. The second packet sequence number and the first packet sequence number are different packet sequence numbers. For example, the second packet sequence number is a packet sequence number that is increased based on the first packet sequence number. The first communications apparatus receives the second data packet sent by the second communications apparatus, and the first communications apparatus may determine, based on the second packet sequence number carried in the second data packet, a data packet that is lost and retransmitted, to improve packet loss recovery efficiency.

For example, the first communications apparatus is a receiver, and the first communications apparatus receives a data packet sent by the second communications apparatus. If the data packet is lost, the data packet is retransmitted, and the retransmitted packet may be lost. To successfully detect a quantity of lost retransmitted packets on a first communications apparatus side, a strictly increasing packet sequence number (represented by PKT.SEQ) is introduced in this embodiment of this application, and is used as an attribute of each packet. In other words, a packet sequence number PKT.SEQ of a packet that is previously sent is less than a packet sequence number PKT.SEQ of a packet that is currently sent. With reference to the new data packet attribute PKT.SEQ, when receiving a packet loss-driven ACK packet, the second communications apparatus that serves as a sender may clearly know a specific data packet (including whether the data packet is a retransmitted packet) that is lost, to improve packet loss recovery efficiency.

212. The second communications apparatus determines the first ACK type corresponding to the first ACK packet based on the ACK mechanism supported by the second communications apparatus, where the first ACK type is one of the N ACK types.

In this embodiment of this application, after the second communications apparatus receives, based on the acknowledgement ACK mechanism supported by the second communications apparatus, the first ACK packet sent by the first communications apparatus, the second communications apparatus and the first communications apparatus use the ACK mechanisms that match each other. Therefore, the second communications apparatus needs to first identify an ACK type of the received first ACK packet. In this case, the second communications apparatus may determine, based on the ACK mechanism supported by the second communications apparatus, that the ACK type corresponding to the first ACK packet is the first ACK type. The first ACK type may be one of the N ACK types indicated in the ACK mechanism.

213. The second communications apparatus parses the first ACK packet by using the first ACK type, to generate an ACK parsing result.

In this embodiment of this application, the second communications apparatus may determine, based on the ACK mechanism supported by the second communications apparatus, that the ACK type corresponding to the first ACK packet is the first ACK type, and the second communications apparatus may parse the first ACK packet by using the first ACK type. The first communications apparatus and the second communications apparatus may send and receive the ACK packet by using the ACK mechanisms that match each other. Therefore, the second communications apparatus may successfully parse the first ACK packet by using the first ACK type, and accordingly the second communications apparatus may generate the ACK parsing result. The ACK parsing result includes whether the first communications apparatus receives the data packet sent by the second communications apparatus and the feedback status of the first communications apparatus for the received data packet.

It may be learned from the example description of this application in the foregoing embodiment the first communications apparatus generates the first ACK packet based on the acknowledgement ACK mechanism supported by the first communications apparatus. The ACK mechanism is used to indicate the N ACK types corresponding to the N ACK packets, the trigger condition required for sending each of the N ACK packets, and the feedback information carried in each of the N ACK packets, the first ACK packet is one of the N ACK packets, and N is greater than or equal to 2. The ACK mechanism used by the first communications apparatus includes the ACK type, the trigger condition, and the feedback information. Therefore, during generation of the first ACK packet, the first communications apparatus needs to generate the first ACK packet based on the ACK type and the feedback information included in the ACK mechanism. In addition, whether the trigger condition required for the first ACK packet is met needs to be further determined before it is determined whether the first ACK packet needs to be generated, and then the first communications apparatus sends the first ACK packet to the second communications apparatus. The second communications apparatus first receives, based on the acknowledgement ACK mechanism supported by the second communications apparatus, the first ACK packet sent by the first communications apparatus, the second communications apparatus determines the first ACK type corresponding to the first ACK packet based on the ACK mechanism supported by the second communications apparatus, and finally, the second communications apparatus parses the first ACK packet by using the first ACK type, to generate the ACK parsing result. In this embodiment of this application, the ACK mechanism may be defined based on the ACK type, the trigger condition, and the feedback information. Therefore, a plurality of ACK types of ACK packets are flexibly customized, and the ACK packet is sent based on the trigger condition, to reduce an ACK sending frequency and improve data transmission efficiency.

To better understand and implement the foregoing solution in this embodiment of this application, the following provides detailed description by using an example of a corresponding application scenario.

The first communications apparatus provided in this embodiment of this application may be a data packet receiver (receiver for short), and the second communications apparatus may be a data packet sender (sender for short). The receiver and the sender may process the ACK packet based on a scalable ACK mechanism, and the receiver and the sender may process a packet by using TCP, to eliminate a TCP extension bottleneck. In this embodiment of this application, a plurality of ACK types may be defined by using a TCP option, a format of the ACK packet (referred to as an ACK or an ACK packet below) is redefined by using a packet option and a data part, and a packet processing manner of the sender and the receiver is modified, to implement an ACK mechanism triggered based on a requirement. In this embodiment of this application, customization of a plurality of ACK types is allowed, and feedback information in the ACK packet may be carried in a data part in a data packet. In addition, in this embodiment of this application, delayed acknowledgement is allowed to be performed based on a requirement, and an ACK frequency may be reduced based on a requirement.

A current TCP ACK mechanism features poor scalability, and flexibility of the ACK mechanism cannot meet diversified service scenarios. In this embodiment of this application, on the basis of compatibility with current TCP implementation, a plurality of ACKs with different functions are flexibly customized, and an amount of information carried in various types of ACKs is enriched, to support the ACK frequency that flexibly changes, so as to improve the scalability of the TCP ACK mechanism, improve adaptability of a transmission protocol to diversified service scenarios, and improve transmission efficiency.

In this embodiment of this application, a plurality of ACKs with different functions are flexibly customized, and an amount of information carried in various types of ACKs is enriched, to support the dynamically adjusted ACK sending frequency.

For example, N types of ACK packets are provided in this embodiment of this application, where N≥2. A feasible classification manner is to perform classification based on a trigger condition. For example, the ACK is sent based on a specified ACK sending frequency, and the ACK is returned based on an instant event. For example, the instant event may be a packet loss event or an event that a receive buffer is full. Specifically, further classification may be performed for the ACK sending frequency, for example, an ACK triggered each time A packets are received and an ACK triggered each time B (A≠B) packets are received. For another example, ACKs triggered by the instant event may be further classified based on information content carried in the ACKs, for example, an ACK that carries delay information and an ACK that carries packet loss information.

The ACK provided in this embodiment of this application carries rich feedback information. The feedback information includes but is not limited to at least one of the following: a timestamp, a flag, a delay, bandwidth, a jitter, a packet sequence number, an amount of data, and the like. The delay includes but is not limited to a queueing delay, a round-trip time, a one-way delay, and the like. The feedback information carried in the ACK is related to a type of the ACK. Therefore, when performing negotiation, the two parties, namely, the sender and the receiver, need to perform negotiation only of ACK mechanisms supported by the two parties. For example, one ACK mechanism includes several specific ACK types, and feedback information carried in each type of ACK and an offset address of the information in a packet are determined.

In this embodiment of this application, the dynamically adjusted ACK frequency may be implemented. For example, in a current wireless local area network, similar interface resources and air interface resources are consumed for the ACK and a data packet. In a current delayed ACK mechanism, a quantity of ACKs is reduced by a maximum of 50%. In a high-throughput scenario, there is still a large quantity of ACKs, and communication overheads caused by the ACK are still not negligible, resulting in low bandwidth utilization. In this embodiment of this application, the ACK sending frequency may be greatly reduced. For example, the quantity of ACKs is reduced to 5% in each packet acknowledgement, and communication overheads are reduced by 95%.

A system architecture or a scenario to which this embodiment of this application is applied is described below in detail. In this embodiment of this application, the ACK packet that may be indicated in the ACK mechanism is customized. Therefore, the solution in this embodiment of this application needs to be deployed on both the two communication parties. In this embodiment of this application, the ACK mechanism in this embodiment of this application is enabled between the two communication parties by using a negotiation mechanism. After the two communication parties complete negotiation, the sender sends a data packet to the receiver, and the receiver generates a corresponding ACK based on the trigger condition and a construction rule specified in the ACK mechanism, and returns the ACK to the sender, so that the sender obtains the ACK packet, and then the sender makes a decision based on the received ACK packet, adjusts sending behavior and logic, and continues to send a data packet, to implement closed-loop control.

This embodiment of this application is applicable to a scenario in which an ACK needs to be fed back based on a requirement and reliable data transmission in a wireless local area network, for example, file distribution and wireless projection. If the ACK mechanism and the implementation method of the ACK mechanism in this embodiment of this application are used, the ACK sending frequency may be reduced while transmission performance is ensured, to reduce overheads of the two communication parties and an intermediate network device.

Figure 9:
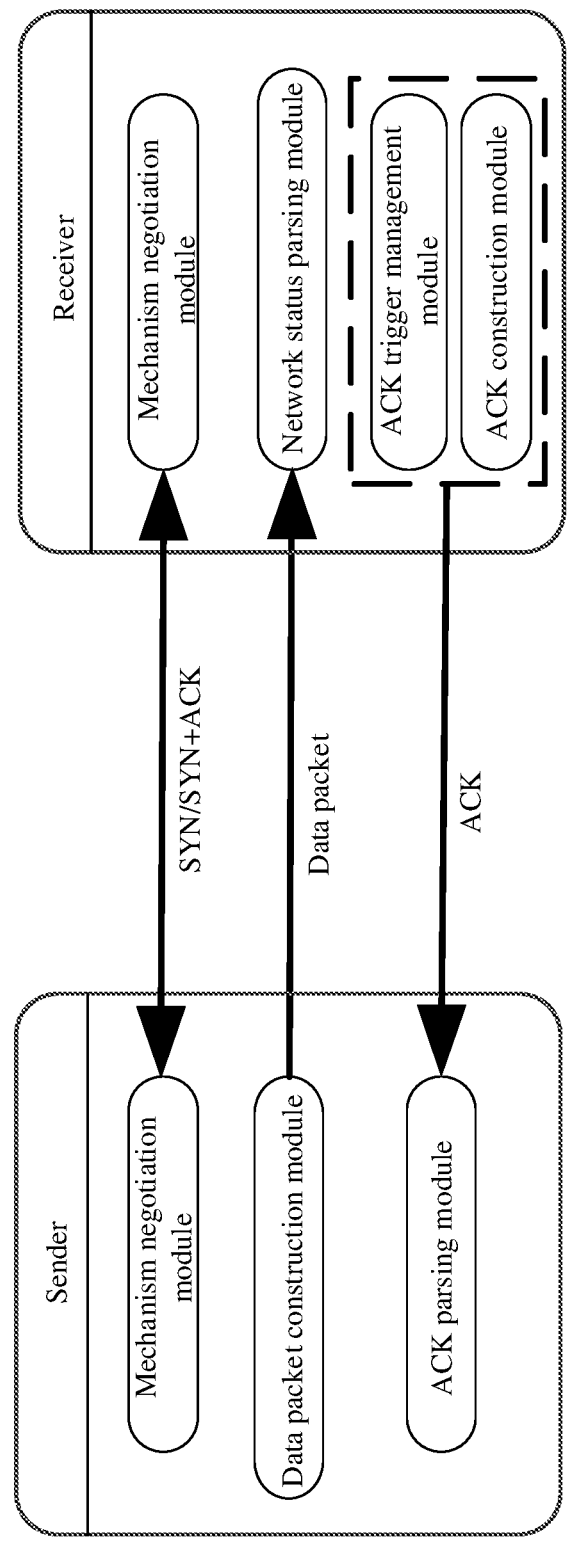
FIG. 9 is an example schematic diagram of a composition structure of each of a sender and a receiver according to an embodiment of this application.

A composition structure of each of the two communication parties provided in this embodiment of this application is described below. The receiver provided in this embodiment of this application may be a sensor, a mobile phone, a tablet, a notebook computer, a personal computer, a server, or the like. The sender provided in this embodiment of this application may be a gateway, an access router, a core router, a front-end router, a load balancer, or the like. In this embodiment of this application, apparatus parts of the two communication parties are changed. Some of specific functional modules are implemented at the sender, and some of the specific functional modules are implemented at the receiver. FIG. 9 is a schematic diagram of a composition structure of each of the sender and the receiver according to an embodiment of this application. A sender side may include a mechanism negotiation module, a data packet construction module, and an ACK parsing module. A receiver side may include a mechanism negotiation module, a network status parsing module, an ACK trigger management module, and an ACK construction module. These modules cooperate with each other, to complete the data exchange procedure in the ACK mechanism in this embodiment of this application. The mechanism negotiation module of the sender and the mechanism negotiation module of the receiver may perform negotiation of an ACK mechanism by using an SYN packet or an SYN packet and an ACK packet. The data packet construction module of the sender may send a data packet to the receiver. After constructing an ACK packet, the ACK construction module of the receiver may send the ACK packet to the sender.

It should be noted that the sender and the receiver may further include other modules (e.g., that are not described in this embodiment of this application), and a quantity of modules included in each of the two communication parties is not limited in this embodiment of this application.

Figure 10:
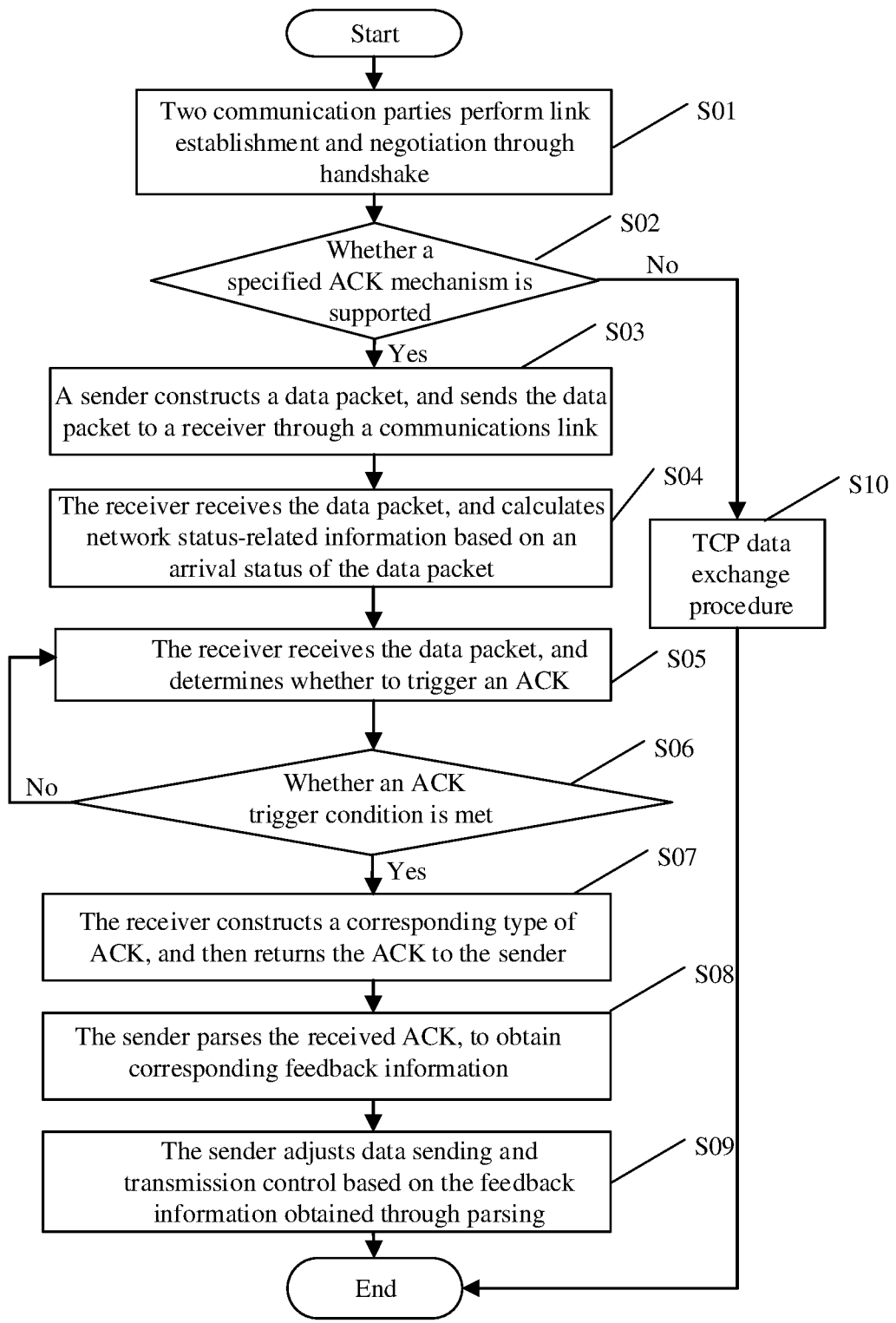
FIG. 10 is an example schematic diagram of an interaction procedure between a receiver and a sender according to an embodiment of this application.

FIG. 10 is a schematic diagram of an interaction procedure between a receiver and a sender according to an embodiment of this application. The interaction procedure mainly includes the following steps.

S01. The two communication parties perform link establishment and negotiation through handshake. Mechanism negotiation modules of the two communication parties (e.g., a client and a server) perform link establishment and negotiation through handshake. In a process of constructing a negotiation packet by the client, the mechanism negotiation module adds a "permitted option" to the negotiation packet, to indicate that the client supports a specified ACK mechanism. In a process of constructing a negotiation packet by the server, the mechanism negotiation module also adds the "permitted option" to the negotiation packet, to indicate whether the server supports the specified ACK mechanism. If both the client and the server support the specified ACK mechanism, negotiation succeeds. In a subsequent data packet transmission process, the ACK mechanism is used, and step S02 is performed. Otherwise, step S10 is performed, and a default ACK mechanism is used to perform a TCP data exchange procedure.

S02. The two communication parties determine whether the specified ACK mechanism is supported.

S03. The sender constructs a data packet, and sends the data packet to the receiver through a communications link.

For example, a data packet construction module of the sender constructs the data packet, and then the sender sends the data packet to the receiver through the communications link.

S04. The receiver receives the data packet, and calculates network status-related information based on an arrival status of the data packet.

For example, the receiver receives the data packet, and calculates network status-related feedback information by using a network status parsing module based on the arrival status of the data packet. The feedback information includes but is not limited to information such as a delay, a rate, and packet loss. For details, refer to the description of the feedback information in the foregoing embodiment.

S05. The receiver receives data, and determines whether to trigger an ACK.

For example, after processing, by using an ACK trigger management module, the information obtained by using the network status parsing module, the receiver determines, based on an ACK type and a trigger condition corresponding to the ACK type, whether to trigger an ACK. For details, refer to the description of the trigger condition in the foregoing embodiment.

S06. The receiver determines whether an ACK trigger condition is met.

S07. When an ACK trigger condition is met, the receiver constructs an ACK of a corresponding type, and then returns the ACK to the sender.

For example, the receiver adds information that needs to be fed back to a data part in the ACK by using an ACK construction module, and constructs an ACK of a corresponding type, and then the receiver returns the ACK to the sender.

S08. The sender parses the received ACK, to obtain corresponding feedback information.

For example, the sender parses the received ACK by using an ACK parsing module, identifies a type of the ACK, and identifies all the feedback information carried in the ACK.

S09. The sender adjusts data sending and transmission control based on the feedback information obtained through parsing.

The sender adjusts data sending and transmission control based on the feedback information obtained through parsing. A specific adjustment policy is not limited herein.

A process of implementing the ACK mechanism provided in this embodiment of this application in TCP is described below by using an example. For example, the ACK mechanism may be represented as an X acknowledgement mechanism (X-Permitted). The X acknowledgement mechanism is classified based on different trigger conditions, and includes two ACK types: an instant acknowledgement (IACK) and a tame acknowledgement (TACK).

The TACK is described below. Regardless of whether there is a data packet that arrives, the TACK is sent based on a specified frequency $f_{tack}$, to synchronize control information between the receiver and the sender. Herein, $f_{tack}$ represents a TACK frequency, and may be obtained by using the following equation:

$$f_{tack} = \min\left(\frac{bw}{L \cdot MSS}, \frac{\beta}{RTT\min}\right)$$

Herein, bw represents maximum bandwidth in a time period, MSS represents a maximum segment size (maximum segment size), $RTT_{min}$ represents a minimum RTT in the time period, L and β are adjustable parameters, $$\frac{bw}{L \cdot MSS}$$

represents that one ACK packet is returned each time L data packets of a size of MSS are received, β is used to control a quantity of TACKs returned in each RTT, and $$\frac{\beta}{RTT\min}$$

represents that β ACKs are returned each time $RTT_{min}$ passes. Specifically, β≥2. For example, in this embodiment of this application, β=4.

A process of calculating an ACK sending frequency is described below by using an example.

A bandwidth and delay product may be represented by $BDP=RTT_{min} \times bw$. When the bandwidth and delay product is greater than or equal to β×L×MSS, the ACK sending frequency is that β ACKs are sent each time $RTT_{min}$ passes. When the bandwidth and delay product is less than β×L× MSS, the ACK sending frequency is that one ACK is sent each time L×MSS data packets are received.

The IACK is described below. In terms of classification by an event type, there are a packet loss-driven IACK and a zero window-advertised IACK.

The packet loss-driven IACK is first described, and the receiver may actively obtain a lost data packet by using the packet loss-driven IACK. A data packet is retransmitted if the data packet is lost, and a retransmitted packet may be lost. To successfully detect a quantity of lost retransmitted packets at the receiver, a strictly increasing packet sequence number (represented by PKT.SEQ) is introduced in this embodiment of this application, and is used as an attribute of each packet. In other words, a packet sequence number PKT.SEQ of a packet that is previously sent is less than a packet sequence number PKT.SEQ of a packet that is currently sent. With reference to the new data packet attribute PKT.SEQ, when receiving the packet loss-driven IACK, the sender may clearly know a specific data packet (including whether the data packet is a retransmitted packet) that is lost, to improve packet loss recovery efficiency.

PKT.SEQ is described below. The sender sends five data packets, and a byte range of the data packets is [0-5999] (MSS=1500 bytes). It is assumed that a packet [1500-2999] whose packet sequence number PKT.SEQ is equal to 2 is lost, and a subsequent packet [3000-4499] whose packet sequence number PKT.SEQ is equal to 3 reaches the receiver. The receiver determines a packet loss event, and notifies the sender of the packet loss event. The sender retransmits the packet [1500-2999] whose packet sequence number PKT.SEQ is equal to 4. If the packet whose packet sequence number PKT.SEQ is equal to 4 is lost again, when a subsequent packet [4500-5999] whose packet sequence number PKT.SEQ is equal to 5 arrives at the receiver, the receiver may still detect a packet loss event by using the disordered packet sequence number PKT.SEQ. However, if there is no PKT.SEQ, it is difficult for the receiver to detect the quantity of lost retransmitted packets.

If the receiver detects that a difference between packet sequence numbers PKT.SEQ of two data packets is greater than 1, the receiver performs detection of a packet loss event. If detecting that the packet loss event occurs, the receiver sends the IACK. The IACK may carry an interval of lost packet sequence numbers PKT.SEQ, and the interval indicates a largest packet sequence number PKT.SEQ and a second largest packet sequence number PKT.SEQ in a receive buffer. A difference between the largest packet sequence number PKT.SEQ and the second largest packet sequence number PKT.SEQ may indicate a data packet that is lost. The sender parses the largest packet sequence number PKT.SEQ and the second largest packet sequence number PKT.SEQ, to find and retransmit the corresponding packet.

The zero window-advertised IACK is described below. When the buffer of the receiver is full, the receiver may send an IACK packet, to indicate the sender to stop sending data. It should be noted that each of the TACK and the IACK carries a packet header the same as that in a TCP ACK. An acknowledgement number in each of the TACK and the IACK has a same meaning as an acknowledgement number in the TCP ACK. The acknowledgement number is a maximum value of consecutive sequence numbers currently received, and is used to notify the sender that all data packets whose sequence numbers are before the sequence number are received, and the sender may release the buffer occupied by the data packets. For example, the sequence number is represented by DATA.SEQ.

An option field added to a TCP option is described below, as shown in Table 2.

| Type | Length | Name | Description |
|------|--------|------|-------------|
| 40 | 2 bytes | X-Permitted | In an SYN packet, indicates that a TACK acknowledgement mechanism is supported |
| 41 | 3 bytes | ACK-Type | Indicates an ACK type |
| 42 | 6 bytes | PKT.SEQ | Indicates PKT.SEQ in a data packet |

An identification procedure of the ACK is described by using Table 2 as an example. The following three newly defined optional fields are added to the TCP option. The TCP option is expressed in a TLV format. Each option field starts with a 1-byte "type (Type)" field used to indicate a type of an option (Option). A 1-byte length (Length) field indicates a total length of the option field (including a total length of Type, Length, and Value).

Based on a TVL structure of the option, a definition of each option field is provided below. Two new option fields are added to the TCP option. A first option field is an ACK mechanism, and the ACK mechanism in Table 2 may be represented as an X acknowledgement mechanism (X-Permitted). In this embodiment, the first option field is structured by using a TLV data structure. Type=40, and this value may be adjusted based on a remaining optional value, in TCP, that is not occupied by another parameter. For example, for Type, when 40 is occupied by another option definition, if 44 is not occupied, Type may be alternatively defined as 44. Length=2 bytes, and a value of a value field is null. In a link establishment process, an SYN handshake packet carries an X-Permitted option, to indicate that a source node of the SYN packet supports a TACK option. After a connection is established, a second option field is ACK-Type. In this embodiment, the second option field is structured by using the TLV data structure. Type=41, and this value may be adjusted based on a remaining available value, in TCP, that is not occupied by another parameter, Length=3 bytes, and a value of a value field is 1 byte, and is used to indicate a specific ACK type. For example, the following definition may be provided: If Value=0x00, it indicates a TACK packet; if Value=0x01, it indicates the packet loss-driven IACK; and if Value=0x02, it indicates the zero window-advertised IACK.

It should be noted that only when an ACK field in a TCP packet header is 1, an ACK-Type option field in the TACK option needs to be identified.

To eliminate "retransmission ambiguity", a strictly increasing packet sequence number (represented by PKT.SEQ) needs to be introduced on the basis of an original sequence number (represented by DATA.SEQ). An implementation of PKT.SEQ may be to add a PKT.SEQ option field to the TCP option. When the X-Permitted option field indicates that the ACK mechanism is supported, each packet carries the PKT.SEQ option field used to indicate a packet sequence number PKT.SEQ of the data packet. The PKT.SEQ field includes a 4-byte value field used to indicate the packet sequence number PKT.SEQ of the data packet.

FIG. 11a is a schematic diagram of a structure of the X-Permitted option field according to an embodiment of this application. In a TLV format of the X-Permitted option field, Type may be equal to 40, and Length may be equal to 2. FIG. 11b is a schematic diagram of a structure of the ACK-Type option field according to an embodiment of this application. In a TLV format of the ACK-Type option field, Type may be equal to 41, Length may be equal to 3, and Value may be equal to 0x00-0xff. FIG. 11c is a schematic diagram of a structure of the PKT.SEQ option field according to an embodiment of this application. In a TLV format of the PKT.SEQ option field, Type may be equal to 42, Length may be equal to 6, and Value may be equal to PKT.SEQ. It may be understood that the values of the TLV formats in FIG. 11a to FIG. 11c are merely examples, and are not intended to limit this embodiment of this application.

It should be noted that in this embodiment of this application, an option field other than a SACK option field (SACK-Permitted and SACK) in the TCP option is still valid. For example, a timestamp option, a window scale window scale (WSCALE or WSopt) option, and a maximum segment size (MSS) option can be configured and used based on a requirement, and are not affected by the ACK mechanism.

X and SACK belong to different ACK mechanisms, and it is stipulated in a feasible embodiment that a priority of SACK-Permitted is lower than that of X-Permitted. Therefore, when X-Permitted indicates that the TACK option is supported, it is considered by default that the SACK option does not take effect. The SACK option takes effect only when X-Permitted indicates that the TACK option is not supported.

A difference between this embodiment of this application and the implementation of the SACK option lies in that the SACK option includes SACK-Permitted and a SACK option of (2+t) (4≥t≥1, and t is an integer) bytes, and in this embodiment of this application, a 3-byte ACK-Type field is added, and one byte in the field is used to indicate different ACK types. In different embodiments, if a quantity of ACK types is beyond a range that can be represented by using one byte, different ACK types may be represented by using a field whose size is greater than 1 byte.

A definition of a structure of the ACK provided in this embodiment of this application is described below. FIG. 12 is a schematic diagram of a structure of a TACK packet according to an embodiment of this application. For a TACK packet, an acknowledgement number field in a TCP packet header in the TACK packet has a same meaning as an acknowledgement number in a TCP ACK, is a maximum number of consecutive sequence numbers currently received, and is used to notify the sender that all data packets whose sequence numbers are before the sequence number are received, and the sender may release the buffer occupied by the data packets. The TACK packet differs from the TCP ACK in that a packet data part is extended in the TACK, an HOL.SEQ field indicates a smallest sequence number DATA.SEQ in the receive buffer, and the acknowledgement number field in a TCP header and the HOL.SEQ field in the data part jointly indicate a first receive buffer bubble (RBB) in the receive buffer, namely, a byte range of an earliest lost data packet.

In addition to packet loss information, the packet data part in the TACK may further indicate bandwidth information (Delivery Rate), window information (Congestion Window), an ACK delay (TACK delay), and an amount of data (Received-flight-bytes) that is received in the receive buffer and that is not submitted to an upper-layer application. As an extension, provided that a size of the entire TACK packet does not exceed MSS, the TACK may further carry more additional RBBs (Additional RBB), to indicate more historical packet loss information and the like. Each additional RBB is represented by using both a left edge (Left Edge of Additional RBB) and a right edge (Right Edge of Additional RBB). In addition, a field in the TCP packet header is reused as much as possible for the TACK, to carry as much information as possible, for example, a timestamp.

Figure 13:
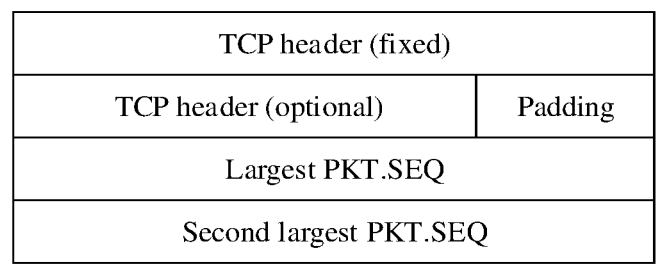
FIG. 13 is an example schematic diagram of a structure of a packet loss-driven IACK packet according to an embodiment of this application.

FIG. 13 is a schematic diagram of a structure of a packet loss-driven IACK packet according to an embodiment of this application. For a packet loss-driven IACK packet, an acknowledgement number field in a TCP packet header in the packet loss-driven IACK packet has a same meaning as an acknowledgement number in a TCP ACK, is a maximum value of consecutive sequence numbers currently received, and is used to notify the sender that all data packets whose sequence numbers are before the sequence number are received, and the sender may release the buffer occupied by the data packets. A difference between the packet loss-driven IACK packet and the TCP ACK is that a packet data part is extended in the IACK. Largest PKT.SEQ and Second Largest PKT.SEQ respectively indicate a largest packet sequence number PKT.SEQ and a second largest packet sequence number PKT.SEQ in the receive buffer.

Figure 14:
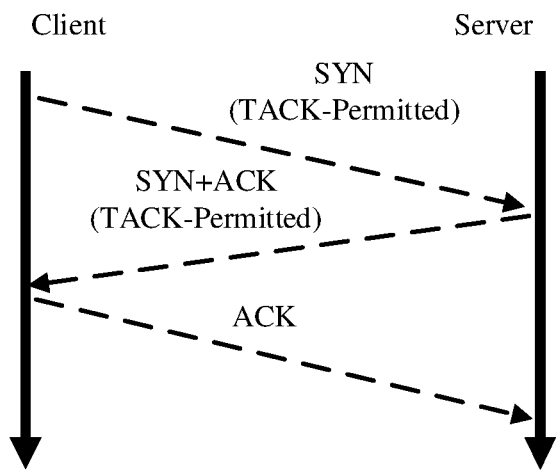
FIG. 14 is an example schematic diagram of a negotiation procedure of an ACK mechanism between two communication parties according to an embodiment of this application.

A negotiation procedure of the ACK mechanism is described below. FIG. 14 is a schematic diagram of a negotiation procedure of an ACK mechanism between two communication parties according to an embodiment of this application. To use the ACK mechanism, a connection initiator needs to add an X-Permitted option field to an SYN packet, to notify a peer end that the connection initiator supports the TACK. A connection responder also needs to add the X-Permitted option field to an SYN+ACK packet, to notify a peer end that the connection responder supports the TACK.

Figure 15:
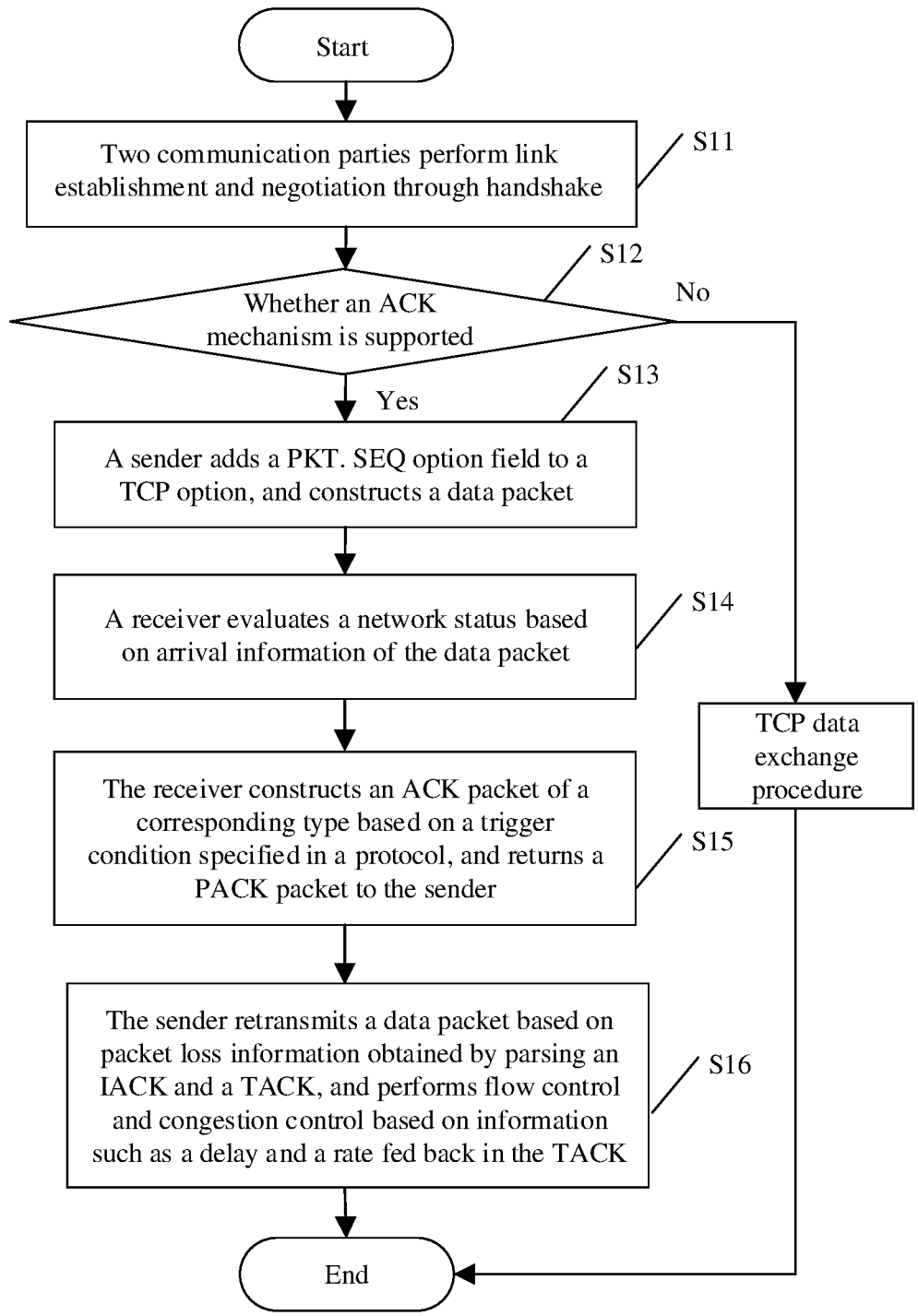
FIG. 15 is an example schematic diagram of a data exchange procedure in an ACK mechanism between two communication parties according to an embodiment of this application.

FIG. 15 is a schematic diagram of a data exchange procedure in an ACK mechanism between two communication parties according to an embodiment of this application. The data interaction procedure includes the following steps.

S11. Perform negotiation of a mechanism. Mechanism negotiation modules of a sender and a receiver perform protocol negotiation.

S12. Whether the ACK mechanism is supported.

During link establishment, an SYN packet, an SYN packet, and an ACK packet are used to determine whether the sender and the receiver support the ACK mechanism. If the ACK mechanism is not supported, a current TCP data exchange procedure is used. If the ACK mechanism is supported, execution of step S13 is triggered.

S13. Send data. A data packet construction module of the sender adds a PKT.SEQ option field to a TCP option, and constructs a data packet.

S14. Parse a network status. A network status parsing module of the receiver evaluates the network status based on arrival information of the data packet. For example, the receiver determines disorder and a packet loss event based on PKT.SEQ, and calculates a delay and a rate based on a packet arrival status.

S15. Construct and trigger an ACK. An ACK trigger management module of the receiver determines, based on a trigger condition specified in a protocol, whether to send an ACK of a specified type. If the ACK trigger management module of the receiver determines to send an ACK, an ACK construction module of the receiver constructs an ACK packet of the corresponding type, and returns the ACK packet to the sender. For example, when the packet loss event occurs, the receiver returns a packet loss-driven IACK, returns a TACK based on a calculated TACK frequency.

S16. Parse the ACK. An ACK parsing module of the sender parses the ACK packet, and performs a corresponding control operation. For example, the sender retransmits a data packet based on packet loss information obtained by parsing the IACK and the TACK, and performs flow control and congestion control based on information such as a delay and a rate fed back in the TACK.

It may be learned from the foregoing example description that in this embodiment of this application, flexibility of the ACK mechanism in the protocol is improved, a TCP extension bottleneck is eliminated, and transmission efficiency is improved. A plurality of ACKs with different functions are flexibly customized, and an amount of information carried in various types of ACKs is enriched, to support an ACK frequency that flexibly changes, so as to improve scalability of the ACK mechanism, improve adaptability of a transmission protocol to diversified service scenarios, and improve transmission efficiency.

In this embodiment, two types of ACKs, namely, the IACK and the TACK, are customized. After disorder occurs, the receiver determines that the packet loss event occurs, and sends the IACK. The IACK is mainly used to feed back packet loss information in a timely manner, so that the sender retransmits a lost data packet in a timely manner. The TACK is mainly used to synchronize other information required for making a decision in a transmission process. The TACK can also be used as a remedy after the IACK is lost. Even if a TACK is lost, the receiver continues to return a next TACK to the sender. In this feedback manner, there is high robustness. In this embodiment of this application, each of the IACK and the TACK includes not only a TCP packet header, and a data part in each of the IACK and the TACK may also carry feedback information.

In this embodiment of this application, the ACK frequency may be reduced, and bandwidth utilization may be improved. In current TCP, a quantity of ACKs is directly proportional to a throughput. A higher throughput indicates a larger quantity of ACKs. A TACK frequency is much less than the quantity of ACKs in conventional TCP in most cases. The IACK is driven by a specific event, and therefore there is usually a very small quantity of IACKs. For example, a quantity of packet loss-driven IACKs is directly proportional to the throughput, and the quantity of packet loss-driven IACKs is also related to a packet loss rate. The packet loss rate is usually a very small value such as 0.1%, and therefore may be ignored. In a wireless local area network, the ACK and a normal data packet occupy almost same spectrum resources. Bandwidth utilization in the wireless network is undoubtedly greatly improved if the quantity of ACKs is reduced.

In this embodiment of this application, flexibility of the ACK mechanism is improved, and transmission efficiency is improved. In comparison with a SACK and a SACK option-based evolution solution, in the ACK mechanism, the IACK and the TACK are customized. Therefore, high flexibility of the ACK mechanism is implemented while compatibility with TCP is implemented. Specifically, packet loss detection is performed at the receiver, and the receiver has more comprehensive data packet arrival information than the sender. Therefore, it may be ensured that a packet loss event is accurately detected in the case of a small quantity of ACKs. Once packet loss occurs, the IACK is used to indicate the sender to retransmit a corresponding data packet, to implement timely packet loss recovery. In addition, the TACK may further regularly feed back necessary information. Therefore, even if the IACK is lost, the feedback information may still be synchronized by using the TACK.

In a possible implementation, an interaction procedure between a first communications apparatus and a second communications apparatus may further include:

The second communications apparatus sends an ACK frequency frame to the first communications apparatus, where the ACK frequency frame is used to indicate an ACK sending frequency to the first communications apparatus;

the first communications apparatus receives the ACK frequency frame from the communications apparatus, where the ACK frequency frame is used to indicate the ACK sending frequency to the first communications apparatus; and the first communications apparatus determines the ACK sending frequency based on the ACK frequency frame, where a trigger condition of the first ACK packet includes: sending the first ACK packet based on the ACK sending frequency.

The ACK sending frequency is a sending frequency for sending an ACK, and the ACK packet can be generated and sent only when the ACK sending frequency is met. In this embodiment of this application, the second communications apparatus may generate the ACK frequency frame, where the ACK frequency frame carries the ACK sending frequency, so that the first communications apparatus may obtain the ACK sending frequency from the second communications apparatus. For example, the ACK frequency frame may be a frame generated by using a quick UDP internet connection (QUIC) protocol.

In a possible implementation, the ACK frequency frame includes a frame type indicator, a frame sequence number, and an ACK frequency field.

The frame type indicator is used to indicate a type of the ACK frequency frame, the frame sequence number is a sequence number of the ACK frequency frame, and the ACK frequency field is used to indicate the ACK sending frequency.

The frame type indicator may indicate the type of the ACK frequency frame. For example, a value of the frame type indicator is 0xXX, and a value of XX may include a value from 00 to FF. For example, the value of the frame type indicator may be a frame type value that is not used in the QUIC protocol. The frame sequence number is the sequence number of the ACK frequency frame, and is configured by the second communications apparatus based on a specific application scenario. The first communications apparatus may obtain the sequence number of the ACK frequency frame based on the frame sequence number. The ACK frequency field is used to indicate the ACK sending frequency determined by the second communications apparatus. For example, the ACK frequency field is specifically an ACK intensity field in the QUIC protocol, and the field carries the ACK sending frequency. A manner in which the second communications apparatus determines the ACK sending frequency is not limited in this embodiment of this application.

A typical embodiment of this application is a TACK mechanism and an implementation of the TACK mechanism in a QUIC protocol.

In the QUIC protocol, parameter negotiation is performed between a sender and a receiver by using a transport parameter. Therefore, the transport parameter may be reused to perform negotiation of the ACK mechanism between the sender and the receiver. In the QUIC protocol, a unit at a transport layer is a packet, and each packet includes one or more frames. Specifically, a new transport parameter field, for example, an ACK frequency support field (ack-intensity-support), is defined. The sender adds ack-intensity-support to a frame, to indicate that the sender supports a specified acknowledgement mechanism. After the receiver receives the frame that carries the ack-intensity-support field, if the receiver supports the specified ACK mechanism, the receiver uses the acknowledgement mechanism in a subsequent transmission process.

The TACK mechanism includes two types of ACK frames: an IACK frame (Instant ACK Frame) and a TACK frame (Tame ACK Frame).

The TACK frame is first described. Regardless of whether there is a data packet that arrives, the TACK frame is sent based on a specified frequency $f_{tack}$, to synchronize control information between the receiver and the sender. Herein, $f_{tack}$ represents a sending frequency of the TACK frame, and may be obtained by using the following equation:

$$f_{tack} = \min\left(\frac{bw}{L \cdot MSS}, \frac{\beta}{RTT\min}\right)$$

Herein, bw represents maximum bandwidth in a time period, MSS represents a maximum segment size (maximum segment size), and is equivalent to a maximum packet size (max packet size) in QUIC, $RTT_{min}$ represents a minimum RTT in the time period, L and $\beta$ are adjustable parameters, $$\frac{bw}{L \cdot MSS}$$

represents that one ACK packet is returned each time L data packets of a size of MSS are received, β is used to control a quantity of TACKs returned in each RTT, and $$\frac{\beta}{RTT\text{min}}$$

represents that β ACKs are returned each time $$\frac{\beta}{RTT\text{min}}$$

passes. For example, β≥2. In this embodiment of this application, β=4.

A method for updating the TACK frequency is as follows: A bandwidth and delay product (bandwidth and delay product, BDP) may be represented by using BDP=$RTT_{min}$×bw. (1) When the bandwidth and delay product is greater than or equal to β×L×MSS, the ACK frequency is updated as follows: β ACKs are sent each time $RTT_{min}$ passes. (2) When the bandwidth and delay product is less than β×L×MSS, the ACK frequency is updated as follows: One ACK is sent each time L×MSS data packets are received.

Figure 20:
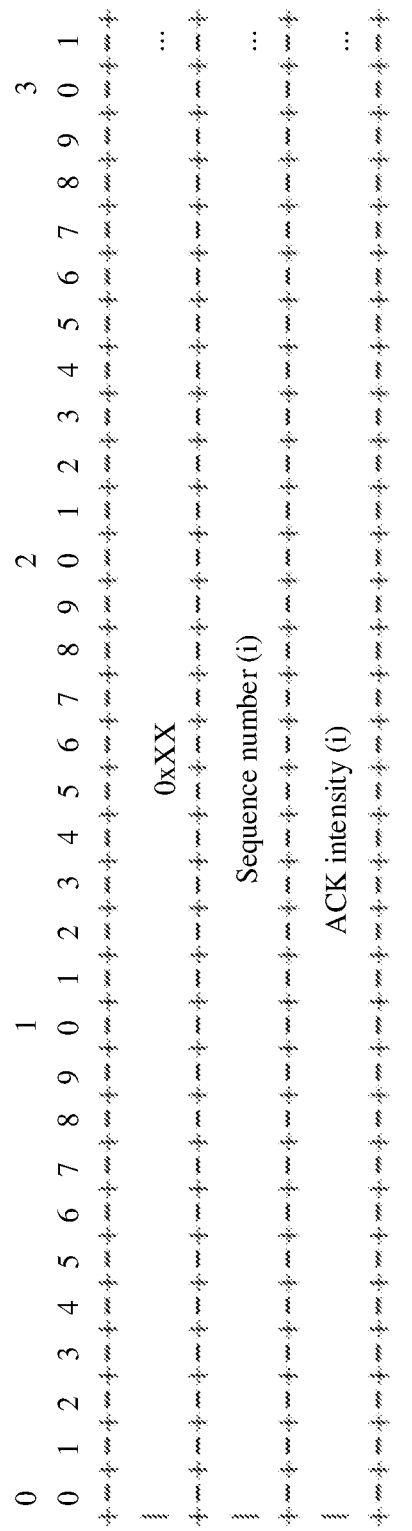
FIG. 20 is an example schematic diagram of a frame structure of an ACK frequency frame according to an embodiment of this application.

The ACK frequency frame (ACK-INTENSITY Frame) is described below. A new frame type, namely, the ACK frequency frame (ACK-INTENSITY Frame), is defined, to synchronize a real-time ACK frequency between the sender and the receiver. The ACK frequency frame is sent by the sender. After parsing, the receiver sends the ACK based on the ACK frequency $f_{tack}$ indicated in the ACK frequency frame. A format of the ACK frequency frame is shown in FIG. 20, where 0xXX is the frame type indicator, Sequence Number is the frame sequence number, and ACK Intensity is the ACK frequency $f_{tack}$.

The packet loss-driven IACK frame is described below, and the receiver may actively obtain a lost data packet by using the packet loss-driven IACK frame. A data packet is retransmitted if the data packet is lost, and a retransmitted packet may be lost. In this embodiment of this application, a strictly increasing packet sequence number (represented by PKT.SEQ) is introduced into the QUIC protocol, and is used as an attribute of each packet. Therefore, with reference to the new data packet attribute PKT.SEQ, when receiving the packet loss-driven IACK, a transmit end may clearly know a specific data packet (including whether the data packet is a retransmitted packet) that is lost, to improve packet loss recovery efficiency. Therefore, when the TACK mechanism is implemented in the QUIC protocol, a new strictly increasing packet sequence number does not need to be introduced.

If detecting that a difference between packet sequence numbers PKT.SEQ of two data packets is greater than 1, a receive end performs detection of a packet loss event. If detecting that the packet loss event occurs, the receive end sends the IACK frame. The IACK frame carries an interval of lost packet sequence numbers PKT.SEQ, and the interval indicates a largest packet sequence number PKT.SEQ and a second largest packet sequence number PKT.SEQ in a receive buffer. A difference for the interval indicates a data packet that is lost in a network. The transmit end parses the interval to find and retransmit the corresponding packet.

It may be learned from the foregoing example description that in this embodiment of this application, the communications apparatus may use the QUIC protocol for the TACK mechanism, to reduce a quantity of ACKs, so as to reduce overheads. In addition, overheads for a control signal such as an ACK frame are reduced, to reduce processor (central processing unit, CPU) overheads of an end node.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to preferred embodiments, and the involved actions and modules are not necessarily required in this application.

To better implement the foregoing solutions in the embodiments of this application, the following further provides related apparatuses configured to implement the foregoing solutions.

Figure 16:
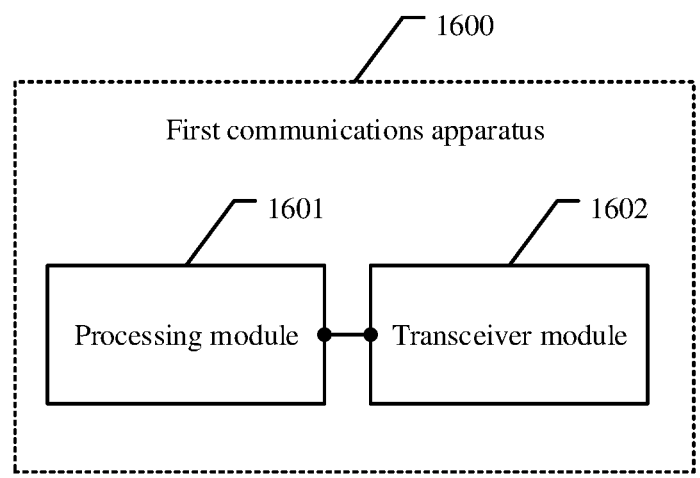
FIG. 16 is an example schematic diagram of a composition structure of a first communications apparatus according to an embodiment of this application.

Refer to FIG. 16. An embodiment of this application provides a first communications apparatus 1600. The first communications apparatus 1600 may include a processing module 1601 and a transceiver module 1602.

The processing module is configured to generate a first ACK packet based on an acknowledgement ACK mechanism supported by the first communications apparatus. The ACK mechanism is used to indicate N ACK types corresponding to N ACK packets, a trigger condition required for sending each of the N ACK packets, and feedback information carried in each of the N ACK packets, the first ACK packet is one of the N ACK packets, and N is a positive integer greater than or equal to 2.

The transceiver module is configured to send the first ACK packet to a second communications apparatus.

In some embodiments of this application, the first ACK packet includes a first ACK type and first feedback information, and the first ACK type is one of the N ACK types.

In some embodiments of this application, the first ACK packet includes an ACK type option;
a size of the ACK type option is (2+m) bytes, where a value of m is a positive integer, and the value of m is positively correlated with a value of N;
one of the (2+m) bytes is used to indicate a kind of the ACK type option;
another byte in the (2+m) bytes is used to indicate a length of the ACK type option; and
the remaining m bytes in the (2+m) bytes are used to indicate the first ACK type.

In some embodiments of this application, the first ACK packet further includes a data field; and
the data field carries at least a part of the first feedback information.

In some embodiments of this application, the transceiver module is further configured to send a first negotiation packet to the second communications apparatus before the processing module generates the first ACK packet based on the acknowledgement ACK mechanism supported by the first communications apparatus, where the first negotiation packet is used to indicate the ACK mechanism supported by the first communications apparatus; and the transceiver module is further configured to: receive a second negotiation packet sent by the second communications apparatus, where the second negotiation packet is used to indicate an ACK mechanism supported by the second communications apparatus; and when the first communications apparatus and the second communications apparatus use ACK mechanisms that match each other, trigger the processing module to generate the first ACK packet based on the acknowledgement ACK mechanism supported by the first communications apparatus.

In some embodiments of this application, the first negotiation packet includes a first permitted option, and the second negotiation packet includes a second permitted option;
- a size of the first permitted option is 2 bytes, one byte in the first permitted option is used to indicate a kind of the first permitted option, and the other byte in the first permitted option is used to indicate a length of the first permitted option; and
- a size of the second permitted option is 2 bytes, one byte in the second permitted option is used to indicate a kind of the second permitted option, and the other byte in the second permitted option is used to indicate a length of the second permitted option.

In some embodiments of this application, a trigger condition for generating the first ACK packet includes at least one of the following:
sending the first ACK packet based on a preset ACK sending frequency, and sending the first ACK packet when a preset instant event occurs.

In some embodiments of this application, the sending the first ACK packet based on a preset ACK sending frequency includes at least one of the following: sending the first ACK packet each time a preset quantity of data packets are received, and sending the first ACK packet each time a preset time period passes.

In some embodiments of this application, the first communications apparatus performs communication through a connection between the first communications apparatus and the second communications apparatus, and the sending the first ACK packet each time a preset quantity of data packets are received includes:
- obtaining a bandwidth and delay product of the connection; and
- when the bandwidth and delay product is less than a preset threshold, sending the first ACK packet each time the preset quantity of data packets are received; or
- when the bandwidth and delay product is less than or equal to a preset threshold, sending the first ACK packet each time the preset quantity of data packets are received.

In some embodiments of this application, the threshold is β×L×MSS, and the preset quantity is L×MSS, where
β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus.

In some embodiments of this application, the first communications apparatus performs communication through a connection between the first communications apparatus and the second communications apparatus, and the sending the first ACK packet each time a preset time period passes includes:
- obtaining a bandwidth and delay product of the connection; and
- when the bandwidth and delay product is greater than or equal to a preset threshold, sending the first ACK packet each time the preset time period passes; or
- when the bandwidth and delay product is greater than a preset threshold, sending the first ACK packet each time the preset time period passes.

In some embodiments of this application, the threshold is β×L×MSS, and the preset time period is $$\frac{RTT\min}{\beta},$$

where
β represents a quantity of ACK packets sent by the first communications apparatus in $RTT_{min}$, L represents a quantity of data packets that need to be received by the first communications apparatus before each ACK packet is sent, MSS represents a maximum segment size of a transport layer protocol, and $RTT_{min}$ represents a minimum round-trip time between the first communications apparatus and the second communications apparatus.

In some embodiments of this application, the obtaining a bandwidth and delay product of the connection includes:
- obtaining maximum bandwidth of the connection between the first communications apparatus and the second communications apparatus and the minimum round-trip time between the first communications apparatus and the second communications apparatus, and determining that the bandwidth and delay product is equal to a result obtained by multiplying the maximum bandwidth and the minimum round-trip time; or
- obtaining average bandwidth of the connection between the first communications apparatus and the second communications apparatus and an average round-trip time between the first communications apparatus and the second communications apparatus, and determining that the bandwidth and delay product is equal to a result obtained by multiplying the average bandwidth and the average round-trip time.

In some embodiments of this application, the instant event includes at least one of the following: a packet loss event and an event that a receive buffer of the first communications apparatus has no remaining capacity.

In some embodiments of this application, the feedback information carried in each of the N ACK packets includes at least one of the following: delay information of the connection between the first communications apparatus and the second communications apparatus, bandwidth information of the connection between the first communications apparatus and the second communications apparatus, jitter information of the connection between the first communications apparatus and the second communications apparatus, packet loss information of the connection between the first communications apparatus and the second communications apparatus information, and status flag information of the connection between the first communications apparatus and the second communications apparatus.

In some embodiments of this application, the transceiver module is further configured to: before the processing module generates the first ACK packet based on the acknowledgement ACK mechanism supported by the first communications apparatus, receive a first data packet sent by the second communications apparatus, where the first data packet carries data content and a first packet sequence number, and when the first communications apparatus determines that the first data packet is lost, the first ACK packet is used to indicate that the first data packet is lost; and the transceiver module is further configured to receive a second data packet sent by the second communications apparatus, where the second data packet carries the data content and a second packet sequence number, and the second packet sequence number and the first packet sequence number are different packet sequence numbers.

Figure 17:
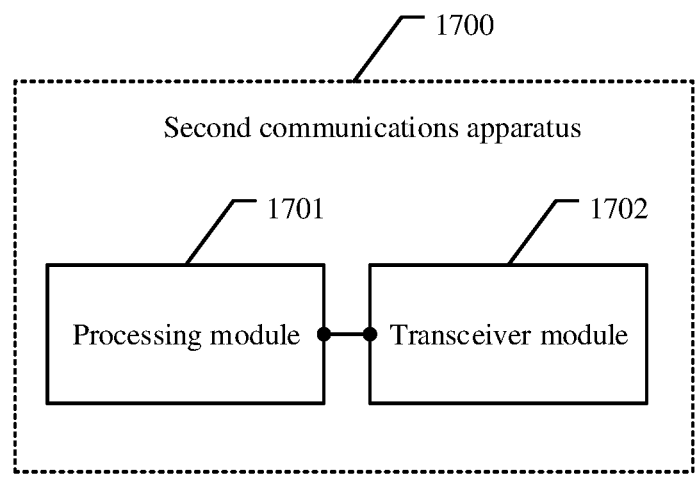
FIG. 17 is an example schematic diagram of a composition structure of a second communications apparatus according to an embodiment of this application.

Refer to FIG. 17. An embodiment of this application provides a second communications apparatus 1700. The second communications apparatus 1700 may include a processing module 1701 and a transceiver module 1702.

The transceiver module is configured to receive, based on an acknowledgement ACK mechanism supported by the second communications apparatus, a first ACK packet sent by a first communications apparatus. The ACK mechanism is used to indicate N ACK types corresponding to N ACK packets and feedback information carried in each of the N ACK packets, the first ACK packet is one of the N ACK packets, and N is a positive integer greater than or equal to 2.

The processing module is configured to determine a first ACK type corresponding to the first ACK packet based on the ACK mechanism supported by the second communications apparatus. The first ACK type is one of the N ACK types.

The processing module is further configured to parse the first ACK packet by using the first ACK type, to generate an ACK parsing result.

In some embodiments of this application, the first ACK packet includes the first ACK type and first feedback information.

In some embodiments of this application, the first ACK packet includes an ACK type option;
  a size of the ACK type option is (2+m) bytes, where a value of m is a positive integer, and the value of m is positively correlated with a value of N;
  one of the (2+m) bytes is used to indicate a kind of the ACK type option;
  another byte in the (2+m) bytes is used to indicate a length of the ACK type option; and
  the remaining m bytes in the (2+m) bytes are used to indicate the first ACK type.

In some embodiments of this application, the first ACK packet further includes a data field; and
  the data field carries at least a part of the first feedback information.

In some embodiments of this application, the transceiver module is further configured to: before receiving, based on the acknowledgement ACK mechanism supported by the second communications apparatus, the first ACK packet sent by the first communications apparatus, receive a first negotiation packet sent by the first communications apparatus, where the first negotiation packet is used to indicate an ACK mechanism supported by the first communications apparatus;

the transceiver module is further configured to send a second negotiation packet to the first communications apparatus, where the second negotiation packet is used to indicate the ACK mechanism supported by the second communications apparatus; and the transceiver module is further configured to: when the first communications apparatus and the second communications apparatus use ACK mechanisms that match each other, trigger execution of the following step of receiving, based on an acknowledgement ACK mechanism supported by the second communications apparatus, a first ACK packet sent by a first communications apparatus.

In some embodiments of this application, the first negotiation packet includes a first permitted option, and the second negotiation packet includes a second permitted option;
  a size of the first permitted option is 2 bytes, one byte in the first permitted option is used to indicate a kind of the first permitted option, and the other byte in the first permitted option is used to indicate a length of the first permitted option; and
  a size of the second permitted option is 2 bytes, one byte in the second permitted option is used to indicate a kind of the second permitted option, and the other byte in the second permitted option is used to indicate a length of the second permitted option.

In some embodiments of this application, the transceiver module is further configured to send a first data packet to the first communications apparatus before receiving, based on the acknowledgement ACK mechanism supported by the second communications apparatus, the first ACK packet sent by the first communications apparatus, where the first data packet carries data content and a first packet sequence number; and the transceiver module is further configured to send a second data packet to the first communications apparatus when determining, based on the first ACK packet, that the first data packet is lost, where the second data packet carries the data content and a second packet sequence number, and the second packet sequence number and the first packet sequence number are different packet sequence numbers.

It should be noted that content such as information exchange between the modules/units of the apparatus and the execution processes thereof is based on the same idea as the method embodiments of this application, and therefore brings the same technical effects as the method embodiments of this application. For specific content, refer to the foregoing descriptions in the method embodiments of this application.

An embodiment of this application further provides a computer storage medium. The computer storage medium stores a program. The program is executed to perform a part or all of the steps described in the foregoing method embodiments.

Figure 18:
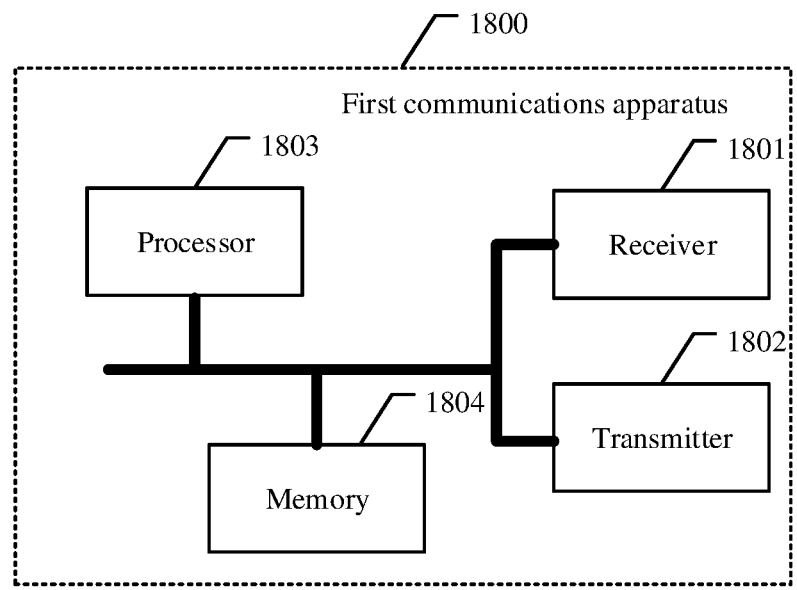
FIG. 18 is an example schematic diagram of a composition structure of another first communications apparatus according to an embodiment of this application.

Another first communications apparatus provided in an embodiment of this application is described below. Refer to FIG. 18. The first communications apparatus 1800 includes:
  a receiver 1801, a transmitter 1802, a processor 1803, and a memory 1804 (there may be one or more processors 1803 in the first communications apparatus 1800, and an example in which there is one processor is used in FIG. 18). In some embodiments of this application, the receiver 1801, the transmitter 1802, the processor 1803, and the memory 1804 may be connected by using a bus or in another manner. In FIG. 18, an example in which a connection is implemented by using the bus is used.

The memory 1804 may include a read-only memory and a random access memory, and provide instructions and data for the processor 1803. A part of the memory 1804 may further include a non-volatile random access memory (NVRAM). The memory 1804 stores an operating system and operation instructions, an executable module or a data structure, a subset thereof, or an extended set thereof. The operation instructions may include various operation instructions for implementing various operations. The operating system may include various system programs for implementing various basic services and processing hardware-based tasks.

The processor 1803 controls an operation of the first communications apparatus. The processor 1803 may also be referred to as a central processing unit (CPU). In specific application, components of the first communications apparatus are coupled together through a bus system. In addition to a data bus, the bus system may further include a power bus, a control bus, a status signal bus, and the like. However, for clear description, various buses in the figure are referred to as the bus system.

The method disclosed in the foregoing embodiments of this application may be applied to the processor 1803, or may be implemented by the processor 1803. The processor 1803 may be an integrated circuit chip and has a signal processing capability. In an implementation process, steps in the foregoing methods may be implemented by using a hardware integrated logic circuit in the processor 1803, or by using instructions in a form of software. The processor 1803 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1803 may implement or perform the methods, the steps, and the logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1804. The processor 1803 reads information in the memory 1804, and completes the steps in the foregoing method in combination with hardware of the processor 1803.

The receiver 1801 may be configured to: receive input digital or character information, and generate signal input related to a related setting and function control of the first communications apparatus. The transmitter 1802 may include a display device such as a display. The transmitter 1802 may be configured to output digital or character information through an external interface.

In this embodiment of this application, the processor 1803 is configured to perform the method performed by the first communications apparatus.

Figure 19:
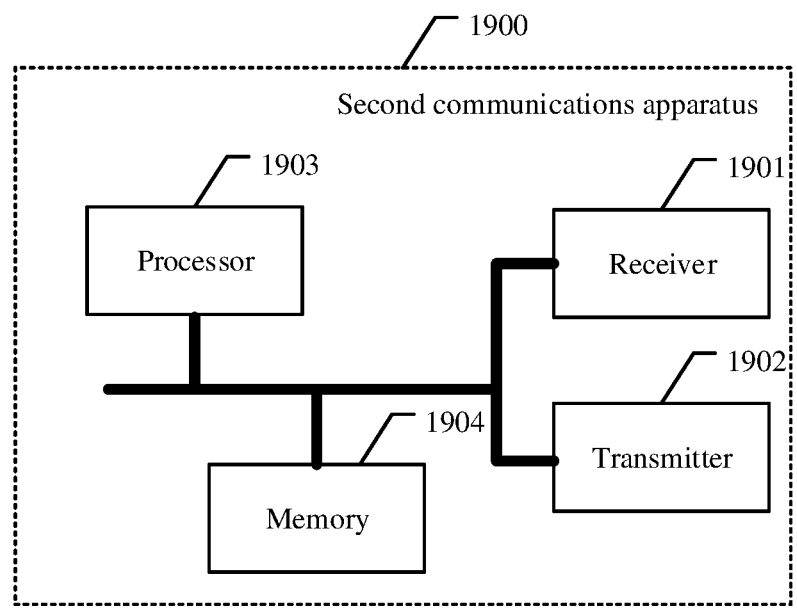
FIG. 19 is an example schematic diagram of a composition structure of another second communications apparatus according to an embodiment of this application.

Another second communications apparatus provided in an embodiment of this application is described below. Referring to FIG. 19, the second communications apparatus 1900 includes:

a receiver 1901, a transmitter 1902, a processor 1903, and a memory 1904 (there may be one or more processors 1903 in the second communications apparatus 1900, and an example in which there is one processor is used in FIG. 19). In some embodiments of this application, the receiver 1901, the transmitter 1902, the processor 1903, and the memory 1904 may be connected by using a bus or in another manner. In FIG. 19, an example in which a connection is implemented by using the bus is used.

The memory 1904 may include a read-only memory and a random access memory, and provide instructions and data for the processor 1903. A part of the memory 1904 may further include an NVRAM. The memory 1904 stores an operating system and operation instructions, an executable module or a data structure, a subset thereof, or an extended set thereof. The operation instructions may include various operation instructions for implementing various operations. The operating system may include various system programs for implementing various basic services and processing hardware-based tasks.

The processor 1903 controls an operation of the second communications apparatus. The processor 1903 may also be referred to as a CPU. In specific application, components of the second communications apparatus are coupled together through a bus system. In addition to a data bus, the bus system may further include a power bus, a control bus, a status signal bus, and the like. However, for clear description, various buses in the figure are referred to as the bus system.

The method disclosed in the foregoing embodiments of this application may be applied to the processor 1903, or may be implemented by the processor 1903. The processor 1903 may be an integrated circuit chip and has a signal processing capability. In an implementation process, steps in the foregoing methods may be implemented by using a hardware integrated logic circuit in the processor 1903, or by using instructions in a form of software. The processor 1903 may be a general-purpose processor, a DSP, an ASIC, an FPGA or another programmable logic device, a discrete gate or transistor logic device, or a discrete hardware component. The processor 1903 may implement or perform the methods, the steps, and the logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1904. The processor 1903 reads information in the memory 1904, and completes the steps in the foregoing method in combination with hardware of the processor 1903.

In this embodiment of this application, the processor 1903 is configured to perform the method performed by the second communications apparatus.

In another possible design, when the first communications apparatus or the second communications apparatus is a chip, the chip includes a processing unit and a communications unit. The processing unit may be, for example, a processor, and the communications unit may be, for example, an input/output interface, a pin, or a circuit. The processing unit may execute computer-executable instructions stored in a storage unit, to enable the chip to perform the acknowledgement packet processing method according to any one of the first aspect or the second aspect. Optionally, the storage unit is a storage unit in the chip, for example, a register or a buffer; or the storage unit may be a storage unit outside the chip and in the terminal, for example, a read-only memory (ROM), another type of static storage device that can store static information and instructions, or a random access memory (RAM).

The processor mentioned above may be a general-purpose central processing unit, a microprocessor, an ASIC, or one or more integrated circuits for controlling program execution of the method according to the first aspect or the second aspect.

In addition, it should be noted that the described apparatus embodiment is merely an example. The units described as separate parts may or may not be physically separate, and parts displayed as units may or may not be physical units, that is, may be located in one place, or may be distributed on a plurality of network units. A part or all of the modules may be selected according to an actual need to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by using software in combination with necessary universal hardware, or may be implemented by using dedicated hardware, including a dedicated integrated circuit, a dedicated CPU, a dedicated memory, a dedicated component, or the like. Generally, any function that is completed by using a computer program can be very easily implemented by using corresponding hardware. Moreover, a specific hardware structure used to implement a same function may be in various forms, for example, in a form of an analog circuit, a digital circuit, a dedicated circuit, or the like. However, for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or a part of the foregoing embodiments may be implemented by using software, hardware, firmware, or any combination thereof. When the software is used to implement the embodiments, all or a part of the embodiments may be implemented in a form of a computer program product.

The computer program product includes one or more computer instructions. When the computer program instructions are loaded and executed on a computer, all or a part of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An acknowledgement packet processing method applied to a first communications apparatus, the method comprising:
   generating a first acknowledgment (ACK) packet based on an ACK mechanism supported by the first communications apparatus, wherein
   the ACK mechanism indicates:
     N ACK types corresponding to N ACK packets,
     a trigger condition required for sending each of the N ACK packets, and
     feedback information carried in each of the N ACK packets,
   the first ACK packet is included in the N ACK packets, and
   N is a positive integer greater than or equal to 2; and
   sending the first ACK packet to a second communications apparatus.

2. The method according to claim 1, wherein
   the first ACK packet comprises a first ACK type and first feedback information, and
   the first ACK type is included in the N ACK types.

3. The method according to claim 2, wherein
   the first ACK packet comprises an ACK type option;
   a size of the ACK type option is (2+m) bytes, wherein a value of m is a positive integer, and the value of m is positively correlated with a value of N;
   a first byte in the (2+m) bytes indicates a kind of the ACK type option;
   a second byte in the (2+m) bytes indicates a length of the ACK type option; and
   remaining m bytes in the (2+m) bytes indicate the first ACK type.

4. The method according to claim 2, wherein
   the first ACK packet further comprises a data field; and
   the data field carries at least a part of the first feedback information.

5. The method according to claim 1, wherein before generating the first ACK packet, the method further comprises:
   sending a first negotiation packet to the second communications apparatus, wherein the first negotiation packet indicates the ACK mechanism supported by the first communications apparatus;
   receiving a second negotiation packet sent from the second communications apparatus, wherein the second negotiation packet indicates an ACK mechanism supported by the second communications apparatus; and
   in association with the first communications apparatus and the second communications apparatus using ACK mechanisms matching each other, generating the first ACK packet based on the ACK mechanism supported by the first communications apparatus.

6. The method according to claim 5, wherein
   the first negotiation packet comprises a first permitted option, and the second negotiation packet comprises a second permitted option;

a size of the first permitted option is 2 bytes, a first byte in the first permitted option indicates a kind of the first permitted option, and a second byte in the first permitted option indicates a length of the first permitted option; and a size of the second permitted option is 2 bytes, a first byte in the second permitted option indicates a kind of the second permitted option, and a second byte in the second permitted option indicates a length of the second permitted option.

7. The method according to claim 1, wherein
a trigger condition for generating the first ACK packet comprises at least one of:
   sending the first ACK packet based on a preset ACK sending frequency, and
   sending the first ACK packet when a preset instant event occurs, and
sending the first ACK packet based on the preset ACK sending frequency comprises at least one of:
   sending the first ACK packet each time a preset quantity of data packets are received, and
   sending the first ACK packet each time a preset time period passes.

8. The method according to claim 7, wherein
the first communications apparatus performs communication through a connection between the first communications apparatus and the second communications apparatus, and
sending the first ACK packet each time the preset quantity of data packets are received comprises:
   obtaining a bandwidth and delay product of the connection between the first communications apparatus and the second communications apparatus; and
   in association with the bandwidth and the delay product being less than a preset threshold, sending the first ACK packet each time the preset quantity of data packets are received; or
   in association with the bandwidth and the delay product being less than or equal to a preset threshold, sending the first ACK packet each time the preset quantity of data packets are received.

9. The method according to claim 7, wherein
the first communications apparatus performs communication through connection between the first communications apparatus and the second communications apparatus, and
sending the first ACK packet each time the preset time period passes comprises:
   obtaining a bandwidth and delay product of the connection between the first communications apparatus and the second communications apparatus; and
   in association with the bandwidth and delay product being greater than or equal to a preset threshold, sending the first ACK packet each time the preset time period passes; or
   in association with the bandwidth and delay product being greater than a preset threshold, sending the first ACK packet each time the preset time period passes.

10. The method according to claim 1, further comprising:
receiving an ACK frequency frame from the second communications apparatus, wherein the ACK frequency frame indicates an ACK sending frequency to the first communications apparatus; and
determining the ACK sending frequency based on the ACK frequency frame, wherein a trigger condition of the first ACK packet comprises:
   sending the first ACK packet based on the ACK sending frequency.

11. A first communications apparatus, comprising:
a processor; and
a memory configured to store computer readable instructions that, when executed by the processor, cause the first communication apparatus to:
   generate a first acknowledgement (ACK) packet based on an (ACK) mechanism supported by the first communications apparatus, wherein
   the ACK mechanism indicates:
      N ACK types corresponding to N ACK packets,
      a trigger condition required for sending each of the N ACK packets, and
      feedback information carried in each of the N ACK packets,
   the first ACK packet is included in the N ACK packets, and
   N is a positive integer greater than or equal to 2; and
send the first ACK packet to a second communications apparatus.

12. The first communications apparatus according to claim 11, wherein
the first ACK packet comprises a first ACK type and first feedback information, and
the first ACK type is included in the N ACK types.

13. The first communications apparatus according to claim 12, wherein
the first ACK packet comprises an ACK type option;
a size of the ACK type option is (2+m) bytes, wherein a value of m is a positive integer, and the value of m is positively correlated with a value of N;
a first byte in the (2+m) bytes indicates a kind of the ACK type option;
a second byte in the (2+m) bytes indicates a length of the ACK type option; and
remaining m bytes in the (2+m) bytes indicate the first ACK type.

14. The first communications apparatus according to claim 12, wherein
the first ACK packet further comprises a data field; and
the data field carries at least a part of the first feedback information.

15. The first communications apparatus according to claim 11, wherein the first communication apparatus is further caused to:
send a first negotiation packet to the second communications apparatus, wherein the first negotiation packet indicates the ACK mechanism supported by the first communications apparatus;
receive a second negotiation packet sent by the second communications apparatus, wherein the second negotiation packet indicates an ACK mechanism supported by the second communications apparatus; and
in association with the first communications apparatus and the second communications apparatus using ACK mechanisms matching each other, generate the first ACK packet based on the ACK mechanism supported by the first communications apparatus.

16. A non-transitory computer-readable storage medium configured to store one or more computer-readable instructions that, when executed by at least one processor, cause the at least one processor to provide execution comprising:
generating a first acknowledgement (ACK) packet based on an ACK mechanism supported by a first communications apparatus, wherein the ACK mechanism indicates:
N ACK types corresponding to N ACK packets,
a trigger condition required for sending each of the N ACK packets, and
feedback information carried in each of the N ACK packets,
the first ACK packet is included in the N ACK packets, and
N is a positive integer greater than or equal to 2; and
sending the first ACK packet to a second communications apparatus.

17. The non-transitory computer-readable storage medium according to claim 16, wherein
the first ACK packet comprises a first ACK type and first feedback information, and
the first ACK type is included in the N ACK types.

18. The non-transitory computer-readable storage medium according to claim 16, wherein
the first ACK packet comprises an ACK type option;
a size of the ACK type option is (2+m) bytes, wherein a value of m is a positive integer, and the value of m is positively correlated with a value of N;
a first byte in the (2+m) bytes indicates a kind of the ACK type option;
a second byte in the (2+m) bytes indicates a length of the ACK type option; and
remaining m bytes in the (2+m) bytes indicate the first ACK type.

19. The non-transitory computer-readable storage medium according to claim 16, wherein
the first ACK packet further comprises a data field; and
the data field carries at least a part of the first feedback information.

20. The non-transitory computer-readable storage medium according to claim 16, wherein the at least one processor is further caused to provide execution comprising:
sending a first negotiation packet to the second communications apparatus, wherein the first negotiation packet indicates the ACK mechanism supported by the first communications apparatus;
receiving a second negotiation packet sent from the second communications apparatus, wherein the second negotiation packet indicates an ACK mechanism supported by the second communications apparatus; and
in association with the first communications apparatus and the second communications apparatus using ACK mechanisms matching each other, generating the first ACK packet based on the ACK mechanism supported by the first communications apparatus.

* * * * *